US012523400B2

(12) United States Patent
Iyoshi et al.

(10) Patent No.: US 12,523,400 B2
(45) Date of Patent: Jan. 13, 2026

(54) REFRIGERATION CYCLE SYSTEM

(71) Applicant: DAIKIN INDUSTRIES, LTD., Osaka (JP)

(72) Inventors: Yuta Iyoshi, Osaka (JP); Yoshiki Yamanoi, Osaka (JP); Kumiko Saeki, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 233 days.

(21) Appl. No.: 18/203,834

(22) Filed: May 31, 2023

(65) Prior Publication Data

US 2023/0304709 A1 Sep. 28, 2023

Related U.S. Application Data

(63) Continuation of application No. PCT/JP2021/043881, filed on Nov. 30, 2021.

(30) Foreign Application Priority Data

Dec. 1, 2020 (JP) ................................. 2020-199793

(51) Int. Cl.
*F25B 41/40* (2021.01)
*F25B 7/00* (2006.01)
*F25B 41/32* (2021.01)

(52) U.S. Cl.
CPC ................ *F25B 41/40* (2021.01); *F25B 7/00* (2013.01); *F25B 41/32* (2021.01)

(58) Field of Classification Search
CPC ............. F25B 41/40; F25B 41/32; F25B 7/00
See application file for complete search history.

(56) References Cited

U.S. PATENT DOCUMENTS 5,383,339 A * 1/1995 McCloskey ............... F25B 6/02
62/434
10,094,577 B2 * 10/2018 Dennis ..................... F24S 60/30
(Continued)

FOREIGN PATENT DOCUMENTS

CN        102884384 A      1/2013
CN        203940649 U      11/2014
(Continued)

OTHER PUBLICATIONS

Extended European Search Report for European Application No. 21900594.9, dated Apr. 4, 2024.
(Continued)

*Primary Examiner* — Henry T Crenshaw
(74) *Attorney, Agent, or Firm* — Birch, Stewart, Kolasch & Birch, LLP

(57) ABSTRACT

A primary refrigerant circuit allows circulation of a primary refrigerant and includes a primary compressor, a cascade heat exchanger, a primary heat exchanger, and a primary switching mechanism. A secondary refrigerant circuit allows circulation of a secondary refrigerant and includes a secondary compressor, the cascade heat exchanger, and a utilization heat exchanger; and an indoor fan configured to supply air to exchange heat with the secondary refrigerant flowing in the utilization heat exchanger When a defrosting condition is satisfied during normal operation, the primary refrigerant circulates in the order of the primary compressor, the primary heat exchanger, and the cascade heat exchanger after the indoor fan is stopped and the secondary compressor is operated.

15 Claims, 9 Drawing Sheets

(56) References Cited

U.S. PATENT DOCUMENTS

| | | | | |
|---|---|---|---|---|
| 2013/0255309 A1* | 10/2013 | Wu | ............................ | F25B 1/10 |
| | | | | 62/510 |
| 2019/0137147 A1* | 5/2019 | Petersen | .................... | F25B 7/00 |
| 2019/0264957 A1* | 8/2019 | Petersen | ................ | F25B 25/005 |
| 2023/0057478 A1* | 2/2023 | Iyoshi | ...................... | F25B 49/02 |
| 2023/0304709 A1* | 9/2023 | Iyoshi | ...................... | F25B 13/00 |
| 2023/0304711 A1* | 9/2023 | Iyoshi | ...................... | F25B 13/00 |
| 2023/0324085 A1* | 10/2023 | Iyoshi | ....................... | F25B 41/40 |
| | | | | 62/510 |
| 2023/0324086 A1* | 10/2023 | Iyoshi | ........................ | F25B 7/00 |
| | | | | 62/132 |

FOREIGN PATENT DOCUMENTS

| | | | |
|---|---|---|---|
| EP | 2 623 898 | * | 7/2013 |
| EP | 2 623 898 A1 | | 8/2013 |
| EP | 3 348 934 A1 | | 7/2018 |
| EP | 3 643 988 A1 | | 4/2020 |
| JP | 59-38568 A | | 3/1984 |
| JP | 63-58048 A | | 3/1988 |
| JP | 63-65245 A | | 3/1988 |
| JP | 2004-190917 A | | 7/2004 |
| JP | 2007-218460 A | | 8/2007 |
| JP | 2008-39332 A | | 2/2008 |
| JP | 2013-210150 A | | 10/2013 |
| JP | 2014-109405 A | | 6/2014 |
| JP | 2016-11783 A | | 1/2016 |
| JP | 2019-20090 A | | 2/2019 |
| WO | WO 2018/235832 A1 | | 12/2018 |

OTHER PUBLICATIONS

Extended European Search Report dated Sep. 5, 2023 for Application No. 21800672.4.

International Preliminary Report on Patentability and English translation of the Written Opinion of the International Searching Authority for International Application No. PCT/JP2021/043881, dated Jun. 15, 2023.

International Preliminary Report on Patentability and English translation of the Written Opinion of the International Searching Authority, for International Application No. PCT/JP2021/017705, dated Nov. 17, 2022.

International Search Report (PCT/ISA/210) issued in PCT/JP2021/017705, dated Jun. 22, 2021.

International Search Report (PCT/ISA/210) issued in PCT/JP2021/043881, dated Jan. 11, 2022.

* cited by examiner

REFRIGERATION CYCLE SYSTEM

CROSS REFERENCE TO RELATED APPLICATIONS

This application is a Continuation of PCT International Application No. PCT/JP2021/043881, filed on Nov. 30, 2021, which claims priority under 35 U.S.C. § 119 (a) to Patent Application No. JP 2020-199793, filed in Japan on Dec. 1, 2020, all of which are hereby expressly incorporated by reference into the present application.

TECHNICAL FIELD

The present disclosure relates to a refrigeration cycle system.

BACKGROUND ART

There has conventionally been known a binary refrigeration apparatus including a primary refrigerant circuit and a secondary refrigerant circuit connected to each other via a cascade heat exchanger. Such a binary refrigeration apparatus executes defrosting operation in order to melt frost adhering to an evaporator for the primary refrigerant circuit during a heating cycle.

For example, Patent Literature 1 (Japanese Laid-Open Patent Publication No. 2014-109405) discloses a water heating system configured to achieve a heating cycle in a primary refrigerant circuit and a secondary refrigerant circuit to heat water flowing in a water circuit in a secondary heat exchanger. In this case, heat is stored in the cascade heat exchanger by stopping a water flow in the water circuit and a refrigerant flow in the secondary refrigerant circuit to operate the primary refrigerant circuit before defrosting operation. The primary refrigerant circuit is switched to a reverse cycle and defrosting operation is executed after such heat storage, to enable sufficient frost melting.

SUMMARY

A refrigeration cycle system according to a first aspect includes a first circuit allowing circulation of a first refrigerant, a second circuit, and a supply unit. The first circuit allows circulation of the first refrigerant. The first circuit includes a first compressor, a cascade heat exchanger, a first heat exchanger, and a first switching unit. The first switching unit is configured to switch a flow path of the first refrigerant. The second circuit allows circulation of a second refrigerant. The second circuit includes a second compressor, the cascade heat exchanger, and a second heat exchanger. The supply unit supplies a heating medium that is to exchange heat with the second refrigerant flowing in the second heat exchanger. The refrigeration cycle system executes second operation when a first condition is satisfied while executing the first operation. The refrigeration cycle system executes third operation after executing the second operation. The first operation includes operating the supply unit while circulating the first refrigerant in the first compressor, the cascade heat exchanger, and the first heat exchanger in the mentioned order and circulating the second refrigerant in the second compressor, the second heat exchanger, and the cascade heat exchanger in the mentioned order. The second operation includes stopping the supply unit or decreasing supply quantity of the heating medium by the supply unit, and operating the second compressor. The third operation includes circulating the first refrigerant in the first compressor, the first heat exchanger, and the cascade heat exchanger in the mentioned order.

The refrigeration cycle system executes the second operation before executing the third operation, so that the second compressor is in operation and the supply unit stops or decreases the supply quantity of the heating medium for reduction in heat radiation from the second refrigerant in the second heat exchanger. It is thus possible to melt frost adhering to the first heat exchanger during the third operation by means of heat stored in the second circuit during the second operation.

DESCRIPTION OF EMBODIMENTS (1) Configuration of Refrigeration Cycle System

Figure 1:
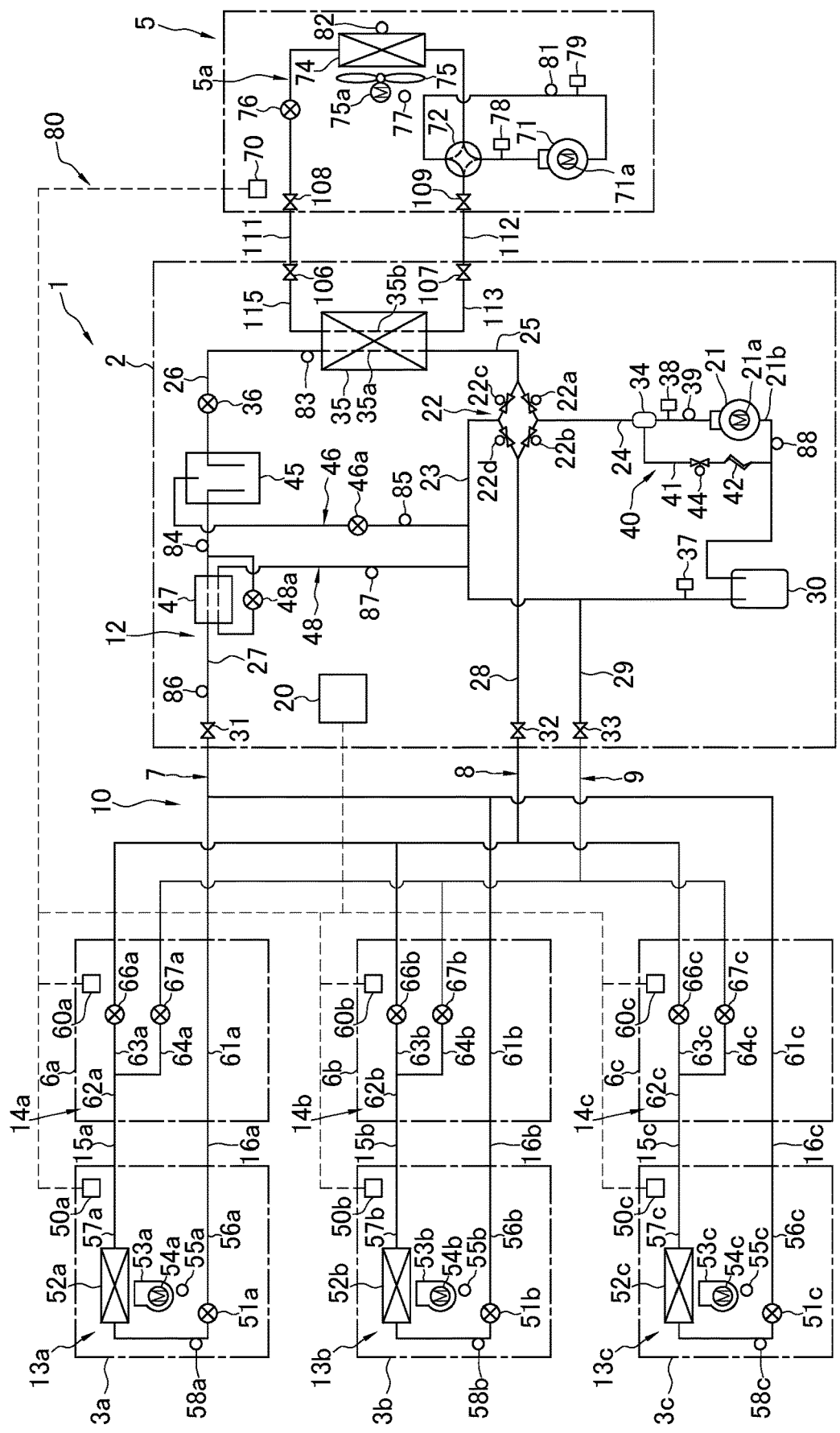
FIG. 1 is a schematic configuration diagram of a refrigeration cycle system.
Figure 2:
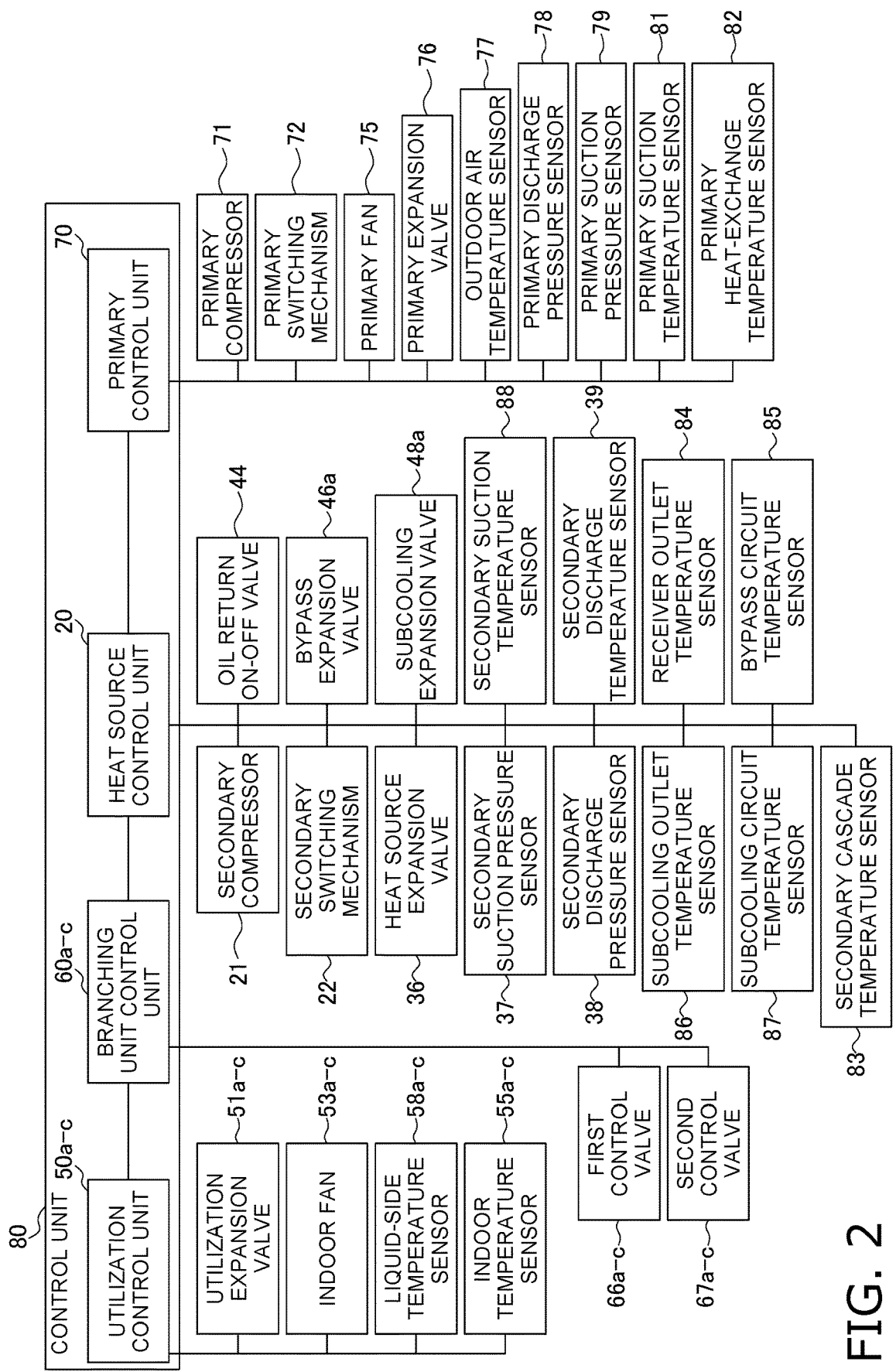
FIG. 2 is a schematic functional block configuration diagram of the refrigeration cycle system.

FIG. 1 is a schematic configuration diagram of a refrigeration cycle system 1. FIG. 2 is a schematic functional block configuration diagram of the refrigeration cycle system 1.

The refrigeration cycle system 1 is configured to execute vapor compression refrigeration cycle operation to be used for cooling or heating an indoor space of a building or the like.

The refrigeration cycle system 1 includes a binary refrigerant circuit consisting of a vapor compression primary refrigerant circuit 5a (corresponding to a first circuit) and a vapor compression secondary refrigerant circuit 10 (corresponding to a second circuit), and achieves a binary refrigeration cycle. The primary refrigerant circuit 5a encloses a refrigerant such as R32 (corresponding to a first refrigerant). The secondary refrigerant circuit 10 encloses a refrigerant such as carbon dioxide (corresponding to a second refrigerant). The primary refrigerant circuit 5a and the secondary refrigerant circuit 10 are thermally connected via a cascade heat exchanger 35 to be described later.

The refrigeration cycle system 1 includes a primary unit 5, a heat source unit 2, a plurality of branching units 6a, 6b, and 6c, and a plurality of utilization units 3a, 3b, and 3c, which are connected correspondingly via pipes. The primary unit 5 and the heat source unit 2 are connected via a primary first connection pipe 111 and a primary second connection pipe 112. The heat source unit 2 and the plurality of branching units 6a, 6b, and 6c are connected via three connection pipes, namely, a secondary second connection pipe 9, a secondary first connection pipe 8, and a secondary third connection pipe 7. The plurality of branching units 6a, 6b, and 6c and the plurality of utilization units 3a, 3b, and 3c are connected via first connecting tubes 15a, 15b, and 15c and second connecting tubes 16a, 16b, and 16c. The present embodiment provides the single primary unit 5. The present embodiment provides the single heat source unit 2. The plurality of utilization units 3a, 3b, and 3c according to the present embodiment includes three utilization units, namely, a first utilization unit 3a, a second utilization unit 3b, and a third utilization unit 3c. The plurality of branching units 6a, 6b, and 6c according to the present embodiment includes three branching units, namely, a first branching unit 6a, a second branching unit 6b, and a third branching unit 6c.

In the refrigeration cycle system 1, the utilization units 3a, 3b, and 3c are configured to individually execute cooling operation or heating operation, and a utilization unit executing heating operation can send a refrigerant to a utilization unit executing cooling operation to achieve heat recovery between the utilization units. Specifically, heat recovery is achieved in the present embodiment by executing mainly cooling operation or mainly heating operation of simultaneously executing cooling operation and heating operation. Furthermore, the refrigeration cycle system 1 is configured to balance a heat load of the heat source unit 2 in accordance with heat loads of all the plurality of utilization units 3a, 3b, and 3c also in consideration of heat recovery mentioned above (mainly cooling operation or mainly heating operation).

(2) Primary Refrigerant Circuit

The primary refrigerant circuit 5a includes a primary compressor 71 (corresponding to a first compressor), a primary switching mechanism 72, a primary heat exchanger 74 (corresponding to a first heat exchanger), a primary expansion valve 76, a first liquid shutoff valve 108, the primary first connection pipe 111, a second liquid shutoff valve 106, a first connecting pipe 115, the cascade heat exchanger 35 shared with the secondary refrigerant circuit 10, a second connecting pipe 113, a second gas shutoff valve 107, the primary second connection pipe 112, and a first gas shutoff valve 109.

The primary compressor 71 is configured to compress a primary refrigerant, and is exemplarily constituted by a positive-displacement compressor of a scroll type or the like configured to inverter control a compressor motor 71a to have variable operating capacity.

In a case where the cascade heat exchanger 35 functions as an evaporator for the primary refrigerant, the primary switching mechanism 72 comes into a fifth connection state of connecting a suction side of the primary compressor 71 and a gas side of a primary flow path 35b of the cascade heat exchanger 35 (see solid lines in the primary switching mechanism 72 in FIG. 1). In another case where the cascade heat exchanger 35 functions as a radiator for the primary refrigerant, the primary switching mechanism 72 comes into a sixth connection state of connecting a discharge side of the primary compressor 71 and the gas side of the primary flow path 35b of the cascade heat exchanger 35 (see broken lines in the primary switching mechanism 72 in FIG. 1). The primary switching mechanism 72 is thus configured to switch the flow path of the refrigerant in the primary refrigerant circuit 5a, and is exemplarily constituted by a four-way switching valve. With change in switching state of the primary switching mechanism 72, the cascade heat exchanger 35 can function as the evaporator or the radiator for the primary refrigerant.

The cascade heat exchanger 35 is configured to cause heat exchange between the primary refrigerant such as R32 and a secondary refrigerant such as carbon dioxide without mixing the refrigerants. The cascade heat exchanger 35 is exemplarily constituted by a plate heat exchanger. The cascade heat exchanger 35 includes a secondary flow path 35a belonging to the secondary refrigerant circuit 10, and the primary flow path 35b belonging to the primary refrigerant circuit 5a. The secondary flow path 35a has a gas side connected to a secondary switching mechanism 22 via a third heat source pipe 25, and a liquid side connected to a heat source expansion valve 36 via a fourth heat source pipe 26. The primary flow path 35b has the gas side connected to the primary compressor 71 via the second connecting pipe 113, the second gas shutoff valve 107, the primary second connection pipe 112, the first gas shutoff valve 109, and the primary switching mechanism 72, and a liquid side connected to the second liquid shutoff valve 106 via the first connecting pipe 115.

The primary heat exchanger 74 is configured to cause heat exchange between the primary refrigerant and outdoor air. The primary heat exchanger 74 has a gas side connected to a pipe extending from the primary switching mechanism 72. The primary heat exchanger 74 has a liquid side connected to the first liquid shutoff valve 108. Examples of the primary heat exchanger 74 include a fin-and-tube heat exchanger constituted by large numbers of heat transfer tubes and fins.

The primary expansion valve 76 is provided at a portion between the liquid side of the primary heat exchanger 74 and the first liquid shutoff valve 108. The primary expansion valve 76 is an electrically powered expansion valve configured to control a flow rate of the primary refrigerant flowing in the primary refrigerant circuit 5a and having a controllable opening degree.

The primary first connection pipe 111 is a pipe connecting the first liquid shutoff valve 108 and the second liquid shutoff valve 106, and connects the primary unit 5 and the heat source unit 2.

The primary second connection pipe 112 is a pipe connecting the first gas shutoff valve 109 and the second gas shutoff valve 107, and connects the primary unit 5 and the heat source unit 2.

The first connecting pipe 115 connects the second liquid shutoff valve 106 and the liquid side of the primary flow path 35b of the cascade heat exchanger 35, and is provided at the heat source unit 2.

The second connecting pipe 113 connects the gas side of the primary flow path 35b of the cascade heat exchanger 35 and the second gas shutoff valve 107, and is provided at the heat source unit 2.

The first gas shutoff valve 109 is provided at a portion between the primary second connection pipe 112 and the primary switching mechanism 72.

(3) Secondary Refrigerant Circuit

The secondary refrigerant circuit 10 includes the plurality of utilization units 3a, 3b, and 3c, the plurality of branching units 6a, 6b, and 6c, and the heat source unit 2, which are connected correspondingly. Each of the utilization units 3a, 3b, and 3c is connected to a corresponding one of the branching units 6a, 6b, and 6c one by one. Specifically, the utilization unit 3a and the branching unit 6a are connected via the first connecting tube 15*a* and the second connecting tube 16*a*, the utilization unit 3*b* and the branching unit 6*b* are connected via the first connecting tube 15*b* and the second connecting tube 16*b*, and the utilization unit 3*c* and the branching unit 6*c* are connected via the first connecting tube 15*c* and the second connecting tube 16*c*. Each of the branching units 6*a*, 6*b*, and 6*c* are connected to the heat source unit 2 via three connection pipes, namely, the secondary third connection pipe 7, the secondary first connection pipe 8, and the secondary second connection pipe 9. Specifically, the secondary third connection pipe 7, the secondary first connection pipe 8, and the secondary second connection pipe 9 extending from the heat source unit 2 are each branched into a plurality of pipes connected to the branching units 6*a*, 6*b*, and 6*c*.

The secondary first connection pipe 8 has a flow of either the refrigerant in a gas-liquid two-phase state or the refrigerant in a gas state in accordance with an operating state. Depending on the type of the second refrigerant, the secondary first connection pipe 8 has a flow of the refrigerant in a supercritical state in accordance with the operating state. The secondary second connection pipe 9 has a flow of either the refrigerant in the gas-liquid two-phase state or the refrigerant in the gas state in accordance with the operating state. The secondary third connection pipe 7 has a flow of either the refrigerant in the gas-liquid two-phase state or the refrigerant in a liquid state in accordance with the operating state. Depending on the type of the second refrigerant, the secondary third connection pipe 7 has a flow of the refrigerant in the supercritical state in accordance with the operating state.

The secondary refrigerant circuit 10 includes a heat source circuit 12, branching circuits 14*a*, 14*b*, and 14*c*, and a utilization circuits 13*a*, 13*b*, and 13*c*, which are connected correspondingly.

The heat source circuit 12 principally includes a secondary compressor 21 (corresponding to a second compressor), the secondary switching mechanism 22 (corresponding to a second switching unit), a first heat source pipe 28, a second heat source pipe 29, a suction flow path 23, a discharge flow path 24, the third heat source pipe 25, the fourth heat source pipe 26, a fifth heat source pipe 27, the cascade heat exchanger 35, the heat source expansion valve 36, a third shutoff valve 31, a first shutoff valve 32, a second shutoff valve 33, a secondary accumulator 30, an oil separator 34, an oil return circuit 40, a secondary receiver 45, a bypass circuit 46 (corresponding to a bypass circuit), a bypass expansion valve 46*a*, a subcooling heat exchanger 47, a subcooling circuit 48 (corresponding to a bypass circuit), and a subcooling expansion valve 48*a*.

The secondary compressor 21 is configured to compress the secondary refrigerant, and is exemplarily constituted by a positive-displacement compressor of a scroll type or the like configured to inverter control a compressor motor 21*a* to have variable operating capacity. The secondary compressor 21 is controlled in accordance with an operating load so as to have larger operating capacity as the load increases.

The secondary switching mechanism 22 is configured to switch a connection state of the secondary refrigerant circuit 10, specifically, the flow path of the refrigerant in the heat source circuit 12. The secondary switching mechanism 22 according to the present embodiment includes four switching valves 22*a*, 22*b*, 22*c*, and 22*d* constituted as two-way valves aligned on an annular flow path. The secondary switching mechanism 22 may alternatively be constituted by a plurality of three-way switching valves combined together. The secondary switching mechanism 22 includes the first switching valve 22*a* provided on a flow path connecting the discharge flow path 24 and the third heat source pipe 25, the second switching valve 22*b* provided on a flow path connecting the discharge flow path 24 and the first heat source pipe 28, the third switching valve 22*c* provided on a flow path connecting the suction flow path 23 and the third heat source pipe 25, and the fourth switching valve 22*d* provided on a flow path connecting the suction flow path 23 and the first heat source pipe 28. Each of the first switching valve 22*a*, the second switching valve 22*b*, the third switching valve 22*c*, and the fourth switching valve 22*d* according to the present embodiment is an electromagnetic valve configured to be switchable between an opened state and a closed state.

In a case where the cascade heat exchanger 35 functions as a radiator for the secondary refrigerant, the secondary switching mechanism 22 comes into a first connection state of bringing the first switching valve 22*a* into the opened state to connect a discharge side of the secondary compressor 21 and the gas side of the secondary flow path 35*a* of the cascade heat exchanger 35, and bringing the third switching valve 22*c* into the closed state. In another case where the cascade heat exchanger 35 functions as an evaporator for the secondary refrigerant, the secondary switching mechanism 22 comes into a second connection state of bringing the third switching valve 22*c* into the opened state to connect a suction side of the secondary compressor 21 and the gas side of the secondary flow path 35*a* of the cascade heat exchanger 35, and bringing the first switching valve 22*a* into the closed state. In a case where the secondary refrigerant discharged from the secondary compressor 21 is sent to the secondary first connection pipe 8, the secondary switching mechanism 22 comes into a third connection state of bringing the second switching valve 22*b* into the opened state to connect the discharge side of the secondary compressor 21 and the secondary first connection pipe 8, and bringing the fourth switching valve 22*d* into the closed state. In another case where the refrigerant flowing in the secondary first connection pipe 8 is sucked into the secondary compressor 21, the secondary switching mechanism 22 comes into a fourth connection state of bringing the fourth switching valve 22*d* into the opened state to connect the secondary first connection pipe 8 and the suction side of the secondary compressor 21, and bringing the second switching valve 22*b* into the closed state.

As described above, the cascade heat exchanger 35 is configured to cause heat exchange between the primary refrigerant such as R32 and the secondary refrigerant such as carbon dioxide without mixing the refrigerants. The cascade heat exchanger 35 includes the secondary flow path 35*a* having a flow of the secondary refrigerant in the secondary refrigerant circuit 10 and the primary flow path 35*b* having a flow of the primary refrigerant in the primary refrigerant circuit 5*a*, so as to be shared between the primary unit 5 and the heat source unit 2. The cascade heat exchanger 35 according to the present embodiment is disposed in a heat source casing (not depicted) of the heat source unit 2. The gas side of the primary flow path 35*b* of the cascade heat exchanger 35 extends to the primary second connection pipe 112 via the second connecting pipe 113 and the second gas shutoff valve 107. The liquid side of the primary flow path 35*b* of the cascade heat exchanger 35 extends to the primary first connection pipe 111 outside the heat source casing (not depicted) via the first connecting pipe 115 and the second liquid shutoff valve 106.

The heat source expansion valve 36 is an electrically powered expansion valve having a controllable opening degree and connected to a liquid side of the cascade heat exchanger 35, in order for control and the like of a flow rate of the secondary refrigerant flowing in the cascade heat exchanger 35. The heat source expansion valve 36 is provided on the fourth heat source pipe 26.

Each of the third shutoff valve 31, the first shutoff valve 32, and the second shutoff valve 33 is provided at a connecting port with an external device or pipe (specifically, the connection pipe 7, 8, or 9). Specifically, the third shutoff valve 31 is connected to the secondary third connection pipe 7 led out of the heat source unit 2. The first shutoff valve 32 is connected to the secondary first connection pipe 8 led out of the heat source unit 2. The second shutoff valve 33 is connected to the secondary second connection pipe 9 led out of the heat source unit 2.

The first heat source pipe 28 is a refrigerant pipe connecting the first shutoff valve 32 and the secondary switching mechanism 22. Specifically, the first heat source pipe 28 connects the first shutoff valve 32 and a portion between the second switching valve 22b and the fourth switching valve 22d in the secondary switching mechanism 22.

The suction flow path 23 connects the secondary switching mechanism 22 and the suction side of the secondary compressor 21. Specifically, the suction flow path 23 connects a portion between the third switching valve 22c and the fourth switching valve 22d in the secondary switching mechanism 22 and the suction side of the secondary compressor 21. The suction flow path 23 has a halfway portion provided with the secondary accumulator 30.

The second heat source pipe 29 is a refrigerant pipe connecting the second shutoff valve 33 and another halfway portion of the suction flow path 23. The second heat source pipe 29 according to the present embodiment is connected to the suction flow path 23 at a connection point between the portion between the second switching valve 22b and the fourth switching valve 22d in the secondary switching mechanism 22 and the secondary accumulator 30 on the suction flow path 23.

The discharge flow path 24 is a refrigerant pipe connecting the discharge side of the secondary compressor 21 and the secondary switching mechanism 22. Specifically, the discharge flow path 24 connects the discharge side of the secondary compressor 21 and a portion between the first switching valve 22a and the second switching valve 22b in the secondary switching mechanism 22.

The third heat source pipe 25 is a refrigerant pipe connecting the secondary switching mechanism 22 and a gas side of the cascade heat exchanger 35. Specifically, the third heat source pipe 25 connects a portion between the first switching valve 22a and the third switching valve 22c in the secondary switching mechanism 22 and a gas side end of the secondary flow path 35a in the cascade heat exchanger 35.

The fourth heat source pipe 26 is a refrigerant pipe connecting the liquid side (opposite to the gas side, and opposite to the side provided with the secondary switching mechanism 22) of the cascade heat exchanger 35 and the secondary receiver 45. Specifically, the fourth heat source pipe 26 connects a liquid side end (opposite to the gas side) of the secondary flow path 35a in the cascade heat exchanger 35 and the secondary receiver 45.

The secondary receiver 45 is a refrigerant reservoir configured to reserve a residue refrigerant in the secondary refrigerant circuit 10. The secondary receiver 45 is provided with the fourth heat source pipe 26, the fifth heat source pipe 27, and the bypass circuit 46 extending outward.

The bypass circuit 46 is a refrigerant pipe connecting a gas phase region corresponding to an upper region in the secondary receiver 45 and the suction flow path 23. Specifically, the bypass circuit 46 is connected between the secondary switching mechanism 22 and the secondary accumulator 30 on the suction flow path 23. The bypass circuit 46 is provided with the bypass expansion valve 46a. The bypass expansion valve 46a is an electrically powered expansion valve having a controllable opening degree to control quantity of the refrigerant guided from inside the secondary receiver 45 to the suction side of the secondary compressor 21.

The fifth heat source pipe 27 is a refrigerant pipe connecting the secondary receiver 45 and the third shutoff valve 31.

The subcooling circuit 48 is a refrigerant pipe connecting part of the fifth heat source pipe 27 and the suction flow path 23. Specifically, the subcooling circuit 48 is connected between the secondary switching mechanism 22 and the secondary accumulator 30 on the suction flow path 23. The subcooling circuit 48 according to the present embodiment extends to branch from a portion between the secondary receiver 45 and the subcooling heat exchanger 47.

The subcooling heat exchanger 47 is configured to cause heat exchange between the refrigerant flowing in a flow path belonging to the fifth heat source pipe 27 and the refrigerant flowing in a flow path belonging to the subcooling circuit 48. The subcooling heat exchanger 47 according to the present embodiment is provided between a portion from where the subcooling circuit 48 branches and the third shutoff valve 31 on the fifth heat source pipe 27. The subcooling expansion valve 48a is provided between a portion branching from the fifth heat source pipe 27 and the subcooling heat exchanger 47 on the subcooling circuit 48. The subcooling expansion valve 48a is an electrically powered expansion valve having a controllable opening degree and configured to supply the subcooling heat exchanger 47 with a decompressed refrigerant.

The secondary accumulator 30 is a reservoir configured to reserve the secondary refrigerant, and is provided on the suction side of the secondary compressor 21.

The oil separator 34 is provided at a halfway portion of the discharge flow path 24. The oil separator 34 is configured to separate refrigerating machine oil discharged from the secondary compressor 21 along with the secondary refrigerant from the secondary refrigerant and return the refrigerating machine oil to the secondary compressor 21.

The oil return circuit 40 is provided to connect the oil separator 34 and the suction flow path 23. The oil return circuit 40 includes an oil return flow path 41 as a flow path extending from the oil separator 34 and extending to join a portion between the secondary accumulator 30 and the suction side of the secondary compressor 21 on the suction flow path 23. The oil return flow path 41 has a halfway portion provided with an oil return capillary tube 42 and an oil return on-off valve 44. When the oil return on-off valve 44 is controlled into the opened state, the refrigerating machine oil separated in the oil separator 34 passes the oil return capillary tube 42 on the oil return flow path 41 and is returned to the suction side of the secondary compressor 21. When the secondary compressor 21 is in operation on the secondary refrigerant circuit 10, the oil return on-off valve 44 according to the present embodiment repetitively is kept in the opened state for predetermined time and is kept in the closed state for predetermined time, to control returned quantity of the refrigerating machine oil through the oil return circuit 40. The oil return on-off valve 44 according to the present embodiment is an electromagnetic valve controlled to be opened and closed. The oil return on-off valve 44 may alternatively be an electrically powered expansion valve having a controllable opening degree and not provided with the oil return capillary tube 42. Description is made below to the utilization circuits 13a, 13b, and 13c. As the utilization circuits 13b and 13c are configured similarly to the utilization circuit 13a, elements of the utilization circuits 13b and 13c will not be described repeatedly, assuming that a subscript "b" or "c" will replace a subscript "a" in reference signs denoting elements of the utilization circuit 13a.

The utilization circuit 13a principally includes a utilization heat exchanger 52a (corresponding to a second heat exchanger), a first utilization pipe 57a, a second utilization pipe 56a, and a utilization expansion valve 51a.

The utilization heat exchanger 52a is configured to cause heat exchange between a refrigerant and indoor air, and examples thereof include a fin-and-tube heat exchanger constituted by large numbers of heat transfer tubes and fins. The plurality of utilization heat exchangers 52a, 52b, and 52c are connected in parallel to the secondary switching mechanism 22, the suction flow path 23, and the cascade heat exchanger 35.

The second utilization pipe 56a has a first end connected to a liquid side (opposite to a gas side) of the utilization heat exchanger 52a in the first utilization unit 3a. The second utilization pipe 56a has a second end connected to the second connecting tube 16a. The second utilization pipe 56a has a halfway portion provided with the utilization expansion valve 51a described above.

The utilization expansion valve 51a is an electrically powered expansion valve configured to control a flow rate of the refrigerant flowing in the utilization heat exchanger 52a, and having a controllable opening degree. The utilization expansion valve 51a is provided on the second utilization pipe 56a.

The first utilization pipe 57a has a first end connected to the gas side of the utilization heat exchanger 52a in the first utilization unit 3a. The first utilization pipe 57a according to the present embodiment is connected to a portion opposite to the utilization expansion valve 51a of the utilization heat exchanger 52a. The first utilization pipe 57a has a second end connected to the first connecting tube 15a.

Description is made below to the branching circuits 14a, 14b, and 14c. As the branching circuits 14b and 14c are configured similarly to the branching circuit 14a, elements of the branching circuits 14b and 14c will not be described repeatedly, assuming that a subscript "b" or "c" will replace a subscript "a" in reference signs denoting elements of the branching circuit 14a.

The branching circuit 14a principally includes a junction pipe 62a, a first branching pipe 63a, a second branching pipe 64a, a first control valve 66a, a second control valve 67a, and a third branching pipe 61a.

The junction pipe 62a has a first end connected to the first connecting tube 15a. The junction pipe 62a has a second end branched to be connected with the first branching pipe 63a and the second branching pipe 64a.

The first branching pipe 63a has a portion not adjacent to the junction pipe 62a and connected to the secondary first connection pipe 8. The first branching pipe 63a is provided with the first control valve 66a configured to be opened and closed. The first control valve 66a is exemplified herein by an electrically powered expansion valve having a controllable opening degree, but may alternatively be exemplified by an electromagnetic valve configured only to be opened and closed.

The second branching pipe 64a has a portion not adjacent to the junction pipe 62a and connected to the secondary second connection pipe 9. The second branching pipe 64a is provided with the second control valve 67a configured to be opened and closed. The second control valve 67a is exemplified herein by an electrically powered expansion valve having a controllable opening degree, but may alternatively be exemplified by an electromagnetic valve configured only to be opened and closed.

The third branching pipe 61a has a first end connected to the second connecting tube 16a. The third branching pipe 61a has a second end connected to the secondary third connection pipe 7.

During cooling operation to be described later, the first branching unit 6a brings the first control valve 66a and the second control valve 67a into the opened state so as to function as follows. The first branching unit 6a sends, to the second connecting tube 16a, the refrigerant flowing into the third branching pipe 61a via the secondary third connection pipe 7. The refrigerant flowing in the second utilization pipe 56a in the first utilization unit 3a via the second connecting tube 16a is sent to the utilization heat exchanger 52a in the first utilization unit 3a via the utilization expansion valve 51a. The refrigerant sent to the utilization heat exchanger 52a is evaporated by heat exchange with indoor air, and then flows in the first connecting tube 15a via the first utilization pipe 57a. The refrigerant having flowed in the first connecting tube 15a is sent to the junction pipe 62a in the first branching unit 6a. The refrigerant having flowed in the junction pipe 62a is branched into the first branching pipe 63a and the second branching pipe 64a. The refrigerant having passed the first control valve 66a on the first branching pipe 63a is sent to the secondary first connection pipe 8. The refrigerant having passed the second control valve 67a on the second branching pipe 64a is sent to the secondary second connection pipe 9.

In a case where the first utilization unit 3a cools the indoor space during mainly cooling operation and mainly heating operation to be described later, the first branching unit 6a brings the first control valve 66a into the closed state and the second control valve 67a into the opened state so as to function as follows. The first branching unit 6a sends, to the second connecting tube 16a, the refrigerant flowing into the third branching pipe 61a via the secondary third connection pipe 7. The refrigerant flowing in the second utilization pipe 56a in the first utilization unit 3a via the second connecting tube 16a is sent to the utilization heat exchanger 52a in the first utilization unit 3a via the utilization expansion valve 51a. The refrigerant sent to the utilization heat exchanger 52a is evaporated by heat exchange with indoor air, and then flows in the first connecting tube 15a via the first utilization pipe 57a. The refrigerant having flowed in the first connecting tube 15a is sent to the junction pipe 62a in the first branching unit 6a. The refrigerant having flowed in the junction pipe 62a flows to the second branching pipe 64a and passes the second control valve 67a to be subsequently sent to the secondary second connection pipe 9.

During heating operation to be described later, the first branching unit 6a brings the second control valve 67a into the opened or closed state and brings the first control valve 66a into the opened state in accordance with an operation condition so as to function as follows. In the first branching unit 6a, the refrigerant flowing into the first branching pipe 63a via the secondary first connection pipe 8 passes the first control valve 66a to be sent to the junction pipe 62a. The refrigerant having flowed in the junction pipe 62a flows in the first utilization pipe 57a in the utilization unit 3a via the first connecting tube 15a to be sent to the utilization heat exchanger 52a. The refrigerant sent to the utilization heat exchanger 52a radiates heat through heat exchange with indoor air, and then passes the utilization expansion valve 51a provided on the second utilization pipe 56a. The refrigerant having passed the second utilization pipe 56a flows in the third branching pipe 61a in the first branching unit 6a via the second connecting tube 16a to be subsequently sent to the secondary third connection pipe 7.

In another case where the first utilization unit 3a heats the indoor space during mainly cooling operation and mainly heating operation to be described later, the first branching unit 6a brings the second control valve 67a into the closed state and brings the first control valve 66a into the opened state so as to function as follows. In the first branching unit 6a, the refrigerant flowing into the first branching pipe 63a via the secondary first connection pipe 8 passes the first control valve 66a to be sent to the junction pipe 62a. The refrigerant having flowed in the junction pipe 62a flows in the first utilization pipe 57a in the utilization unit 3a via the first connecting tube 15a to be sent to the utilization heat exchanger 52a. The refrigerant sent to the utilization heat exchanger 52a radiates heat through heat exchange with indoor air, and then passes the utilization expansion valve 51a provided on the second utilization pipe 56a. The refrigerant having passed the second utilization pipe 56a flows in the third branching pipe 61a in the first branching unit 6a via the second connecting tube 16a to be subsequently sent to the secondary third connection pipe 7.

The first branching unit 6a, as well as the second branching unit 6b and the third branching unit 6c, similarly have such a function. Accordingly, the first branching unit 6a, the second branching unit 6b, and the third branching unit 6c are configured to individually switchably cause the utilization heat exchangers 52a, 52b, and 52c to function as a refrigerant evaporator or a refrigerant radiator.

(4) Primary Unit

The primary unit 5 is disposed in a space different from a space provided with the utilization units 3a, 3b, and 3c and the branching units 6a, 6b, and 6c, on a roof, or the like.

The primary unit 5 includes part of the primary refrigerant circuit 5a described above, a primary fan 75, various sensors, and a primary control unit 70, which are accommodated in a primary casing (not depicted).

The primary unit 5 includes, as the part of the primary refrigerant circuit 5a, the primary compressor 71, the primary switching mechanism 72, the primary heat exchanger 74, the primary expansion valve 76, the first liquid shutoff valve 108, and the first gas shutoff valve 109.

The primary fan 75 is provided in the primary unit 5, and is configured to generate an air flow of guiding outdoor air into the primary heat exchanger 74, and exhausting, to outdoors, air obtained after heat exchange with the primary refrigerant flowing in the primary heat exchanger 74. The primary fan 75 is driven by a primary fan motor 75a.

The primary unit 5 is provided with the various sensors. Specifically, there are provided an outdoor air temperature sensor 77 configured to detect temperature of outdoor air to be subject to pass the primary heat exchanger 74, a primary discharge pressure sensor 78 configured to detect pressure of the primary refrigerant discharged from the primary compressor 71, a primary suction pressure sensor 79 configured to detect pressure of the primary refrigerant sucked into the primary compressor 71, a primary suction temperature sensor 81 configured to detect temperature of the primary refrigerant sucked into the primary compressor 71, and a primary heat-exchange temperature sensor 82 configured to detect temperature of the refrigerant flowing in the primary heat exchanger 74.

The primary control unit 70 controls behavior of the elements 71 (71a), 72, 75 (75a), and 76 provided in the primary unit 5. The primary control unit 70 includes a processor such as a CPU or a microcomputer provided to control the primary unit 5 and a memory, so as to transmit and receive control signals and the like to and from a remote controller (not depicted), and to transmit and receive control signals and the like among a heat source control unit 20, branching unit control units 60a, 60b, and 60c, and utilization control units 50a, 50b, and 50c.

(5) Heat Source Unit

The heat source unit 2 is disposed in a space different from the space provided with the utilization units 3a, 3b, and 3c and the branching units 6a, 6b, and 6c, on a roof, or the like. The heat source unit 2 is connected to the branching units 6a, 6b, and 6c via the connection pipes 7, 8, and 9, to constitute part of the secondary refrigerant circuit 10. The heat source unit 2 is connected with the primary unit 5 via the primary first connection pipe 111 and the primary second connection pipe 112, to constitute part of the primary refrigerant circuit 5a.

The heat source unit 2 principally includes the heat source circuit 12 described above, various sensors, the heat source control unit 20, the second liquid shutoff valve 106 constituting part of the primary refrigerant circuit 5a, the first connecting pipe 115, the second connecting pipe 113, and the second gas shutoff valve 107, which are accommodated in the heat source casing (not depicted).

The heat source unit 2 is provided with a secondary suction pressure sensor 37 configured to detect pressure of the secondary refrigerant on the suction side of the secondary compressor 21, a secondary discharge pressure sensor 38 configured to detect pressure of the secondary refrigerant on the discharge side of the secondary compressor 21, a secondary discharge temperature sensor 39 configured to detect temperature of the secondary refrigerant on the discharge side of the secondary compressor 21, a secondary suction temperature sensor 88 configured to detect temperature of the secondary refrigerant on the suction side of the secondary compressor 21, a secondary cascade temperature sensor 83 configured to detect temperature of the secondary refrigerant flowing between the secondary flow path 35a of the cascade heat exchanger 35 and the heat source expansion valve 36, a receiver outlet temperature sensor 84 configured to detect temperature of the secondary refrigerant flowing between the secondary receiver 45 and the subcooling heat exchanger 47, a bypass circuit temperature sensor 85 configured to detect temperature of the secondary refrigerant flowing downstream of the bypass expansion valve 46a on the bypass circuit 46, a subcooling outlet temperature sensor 86 configured to detect temperature of the secondary refrigerant flowing between the subcooling heat exchanger 47 and the third shutoff valve 31, and a subcooling circuit temperature sensor 87 configured to detect temperature of the secondary refrigerant flowing at an outlet of the subcooling heat exchanger 47 on the subcooling circuit 48.

The heat source control unit 20 controls behavior of the elements 21 (21a), 22, 36, 44, 46a, and 48a provided in the heat source unit 2. The heat source control unit 20 includes a processor such as a CPU or a microcomputer provided to control the heat source unit 2 and a memory, so as to transmit and receive control signals and the like among the primary control unit 70 in the primary unit 5, the utilization control units 50a, 50b, and 50c in the utilization units 3a, 3b, and 3c, and the branching unit control units 60a, 60b, and 60c.

(6) Utilization Unit

The utilization units 3a, 3b, and 3c are installed by being embedded in or being suspended from a ceiling in an indoor space of a building or the like, or by being hung on a wall surface in the indoor space, or the like.

The utilization units 3a, 3b, and 3c are connected to the heat source unit 2 via the connection pipes 7, 8, and 9.

The utilization units 3a, 3b, and 3c respectively include the utilization circuits 13a, 13b, and 13c constituting part of the secondary refrigerant circuit 10.

The utilization units 3a, 3b, and 3c will be described hereinafter in terms of their configurations. The second utilization unit 3b and the third utilization unit 3c are configured similarly to the first utilization unit 3a. The configuration of only the first utilization unit 3a will thus be described herein. As to the configuration of each of the second utilization unit 3b and the third utilization unit 3c, elements will be denoted by reference signs obtained by replacing a subscript "a" in reference signs of elements of the first utilization unit 3a with a subscript "b" or "c", and these elements will not be described repeatedly.

The first utilization unit 3a principally includes the utilization circuit 13a described above, an indoor fan 53a (corresponding to a supply unit), the utilization control unit 50a, and various sensors. The indoor fan 53a includes an indoor fan motor 54a.

The indoor fan 53a generates an air flow of sucking indoor air into the unit and supplying the indoor space with supply air obtained after heat exchange with the refrigerant flowing in the utilization heat exchanger 52a. The indoor fan 53a is driven by the indoor fan motor 54a.

The utilization unit 3a is provided with a liquid-side temperature sensor 58a configured to detect temperature of a refrigerant on the liquid side of the utilization heat exchanger 52a. The utilization unit 3a is further provided with an indoor temperature sensor 55a configured to detect indoor temperature as temperature of air introduced from the indoor space and to be subject to pass the utilization heat exchanger 52a.

The utilization control unit 50a controls behavior of the elements 51a and 53a (54a) of the utilization unit 3a. The utilization control unit 50a includes a processor such as a CPU or a microcomputer provided to control the utilization unit 3a and a memory, so as to transmit and receive control signals and the like to and from the remote controller (not depicted), and to transmit and receive control signals and the like among the heat source control unit 20, the branching unit control units 60a, 60b, and 60c, and the primary control unit 70 in the primary unit 5.

The second utilization unit 3b includes the utilization circuit 13b, an indoor fan 53b, the utilization control unit 50b, and an indoor fan motor 54b. The third utilization unit 3c includes the utilization circuit 13c, an indoor fan 53c, the utilization control unit 50c, and an indoor fan motor 54c.

(7) Branching Unit

The branching units 6a, 6b, and 6c are installed in a space behind the ceiling of the indoor space of the building or the like.

Each of the branching units 6a, 6b, and 6c is connected to a corresponding one of the utilization units 3a, 3b, and 3c one by one. The branching units 6a, 6b, and 6c are connected to the heat source unit 2 via the connection pipes 7, 8, and 9.

The branching units 6a, 6b, and 6c will be described next in terms of their configurations. The second branching unit 6b and the third branching unit 6c are configured similarly to the first branching unit 6a. The configuration of only the first branching unit 6a will thus be described herein. As to the configuration of each of the second branching unit 6b and the third branching unit 6c, elements will be denoted by reference signs obtained by replacing a subscript "a" in reference signs of elements of the first branching unit 6a with a subscript "b" or "c", and these elements will not be described repeatedly.

The first branching unit 6a principally includes the branching circuit 14a described above, and the branching unit control unit 60a.

The branching unit control unit 60a controls behavior of the elements 66a and 67a of the branching unit 6a. The branching unit control unit 60a includes a processor such as a CPU or a microcomputer provided to control the branching unit 6a and a memory, so as to transmit and receive control signals and the like to and from the remote controller (not depicted), and to transmit and receive control signals and the like among the heat source control unit 20, the utilization units 3a, 3b, and 3c, and the primary control unit 70 in the primary unit 5.

The second branching unit 6b includes the branching circuit 14b, and the branching unit control unit 60b. The third branching unit 6c includes the branching circuit 14c, and the branching unit control unit 60c.

(8) Control Unit

In the refrigeration cycle system 1, the heat source control unit 20, the utilization control units 50a, 50b, and 50c, the branching unit control units 60a, 60b, and 60c, and the primary control unit 70 described above are connected wiredly or wirelessly to be mutually communicable so as to constitute a control unit 80. The control unit 80 accordingly controls behavior of the elements 21 (21a), 22, 36, 44, 46a, 48a, 51a, 51b, 51c, 53a, 53b, 53c (54a, 54b, 54c), 66a, 66b, 66c, 67a, 67b, 67c, 71 (71a), 72, 75 (75a), and 76 in accordance with detection information of the various sensors 37, 38, 39, 83, 84, 85, 86, 87, 88, 77, 78, 79, 81, 82, 58a, 58b, 58c, and the like, command information received from the remote controller (not depicted), and the like.

(9) Behavior of Refrigeration Cycle System

Description is made next to behavior of the refrigeration cycle system 1 with reference to FIG. 3 to FIG. 6.

Refrigeration cycle operation of the refrigeration cycle system 1 can be divided principally into cooling operation, heating operation, mainly cooling operation, and mainly heating operation. During heating operation and mainly heating operation, heat storing operation and defrosting operation to be described later are executed if a predetermined condition is satisfied.

Herein, cooling operation corresponds to refrigeration cycle operation in a case where there are only utilization units each of which operates with the utilization heat exchanger functioning as a refrigerant evaporator, and the cascade heat exchanger 35 functions as a radiator for the secondary refrigerant with respect to evaporation loads of all the utilization units.

Heating operation corresponds to refrigeration cycle operation in a case where there are only utilization units each of which operates with the utilization heat exchanger functioning as a refrigerant radiator, and the cascade heat exchanger 35 functions as an evaporator for the secondary refrigerant with respect to radiation loads of all the utilization units.

During mainly cooling operation, there coexist a utilization unit operating with the utilization heat exchanger functioning as a refrigerant evaporator and a utilization unit operating with the utilization heat exchanger functioning as a refrigerant radiator. Mainly cooling operation corresponds to refrigeration cycle operation in a case where the cascade heat exchanger 35 functions as a radiator for the secondary refrigerant with respect to evaporation loads of all the utilization units principally occupying heat loads of all the utilization units.

During mainly heating operation, there coexist a utilization unit operating with the utilization heat exchanger functioning as a refrigerant evaporator, and a utilization unit operating with the utilization heat exchanger functioning as a refrigerant radiator. Mainly heating operation corresponds to refrigeration cycle operation in a case where the cascade heat exchanger 35 functions as an evaporator for the secondary refrigerant with respect to radiation loads of all the utilization units principally occupying heat loads of all the utilization units.

Behavior of the refrigeration cycle system 1 including these types of refrigeration cycle operation is executed by the control unit 80.

(9-1) Cooling Operation

Figure 3:
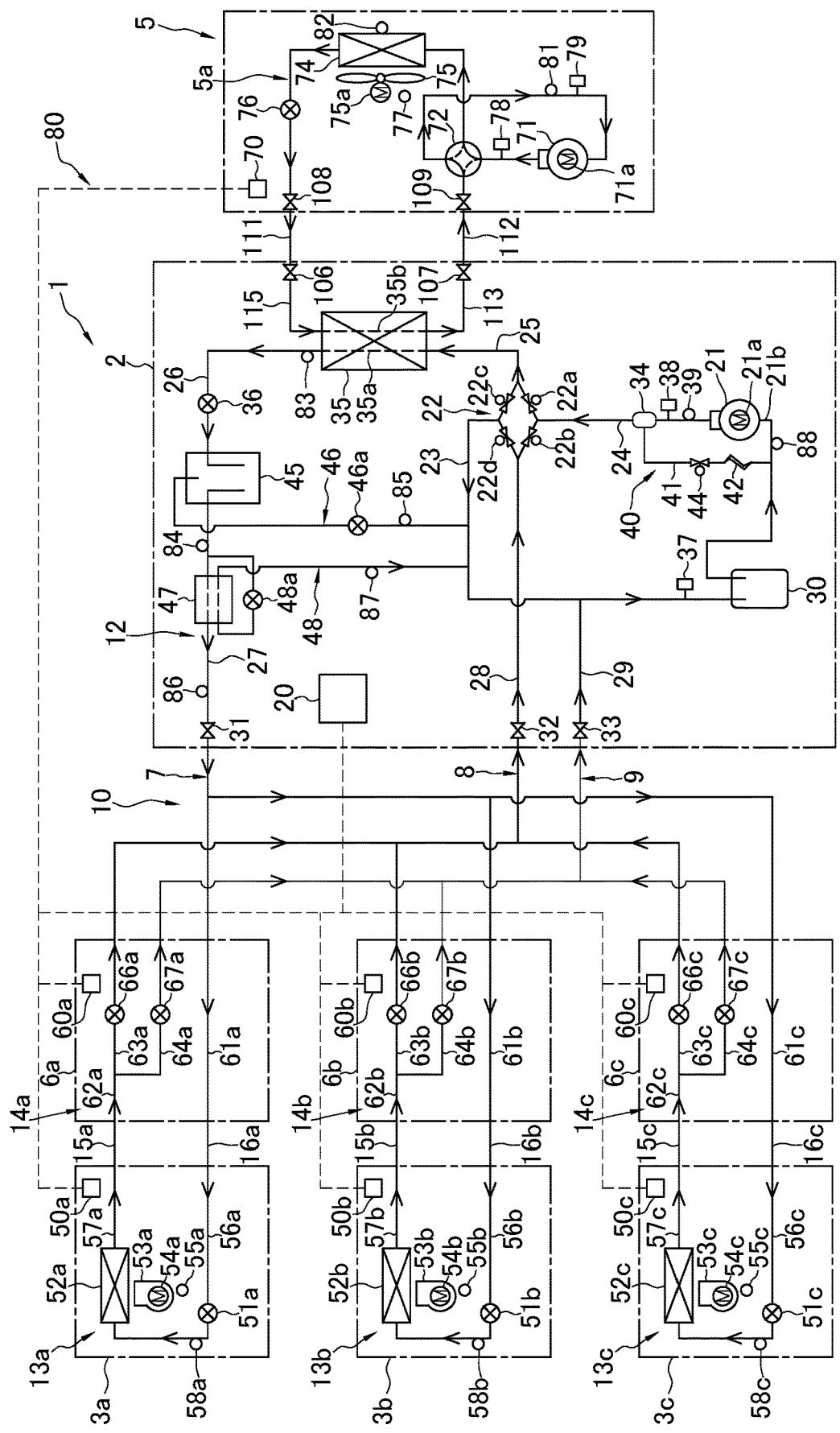
FIG. 3 is a view indicating behavior (a refrigerant flow) during cooling operation of the refrigeration cycle system.

During cooling operation, for example, each of the utilization heat exchangers 52a, 52b, and 52c in the utilization units 3a, 3b, and 3c functions as a refrigerant evaporator, and the cascade heat exchanger 35 functions as a radiator for the secondary refrigerant. During such cooling operation, the primary refrigerant circuit 5a and the secondary refrigerant circuit 10 in the refrigeration cycle system 1 are configured as depicted in FIG. 3. FIG. 3 includes arrows provided to the primary refrigerant circuit 5a and arrows provided to the secondary refrigerant circuit 10, which indicate refrigerant flows during cooling operation.

Specifically, in the primary unit 5, the primary switching mechanism 72 is switched into the fifth connection state to cause the cascade heat exchanger 35 to function as an evaporator for the primary refrigerant. The fifth connection state of the primary switching mechanism 72 is depicted by solid lines in the primary switching mechanism 72 in FIG. 3. Accordingly in the primary unit 5, the primary refrigerant discharged from the primary compressor 71 passes the primary switching mechanism 72 and exchanges heat with outdoor air supplied from the primary fan 75 in the primary heat exchanger 74 to be condensed. The primary refrigerant condensed in the primary heat exchanger 74 is decompressed at the primary expansion valve 76, then flows in the primary flow path 35b of the cascade heat exchanger 35 to be evaporated, and is sucked into the primary compressor 71 via the primary switching mechanism 72.

In the heat source unit 2, the secondary switching mechanism 22 is switched into the first connection state as well as the fourth connection state to cause the cascade heat exchanger 35 to function as a radiator for the secondary refrigerant. In the first connection state of the secondary switching mechanism 22, the first switching valve 22a is in the opened state and the third switching valve 22c is in the closed state. In the fourth connection state of the secondary switching mechanism 22, the fourth switching valve 22d is in the opened state and the second switching valve 22b is in the closed state. The heat source expansion valve 36 is controlled in opening degree. In the first to third utilization units 3a, 3b, and 3c, the first control valves 66a, 66b, and 66c and the second control valves 67a, 67b, and 67c are controlled into the opened state. Accordingly, each of the utilization heat exchangers 52a, 52b, and 52c in the utilization units 3a, 3b, and 3c functions as a refrigerant evaporator. All the utilization heat exchangers 52a, 52b, and 52c in the utilization units 3a, 3b, and 3c and the suction side of the secondary compressor 21 in the heat source unit 2 are connected via the first utilization pipes 57a, 57b, and 57c, the first connecting tubes 15a, 15b, and 15c, the junction pipes 62a, 62b, and 62c, the first branching pipes 63a, 63b, and 63c, the second branching pipes 64a, 64b, and 64c, the first connection pipe 8, and the second connection pipe 9. The subcooling expansion valve 48a is controlled in opening degree such that the secondary refrigerant flowing at the outlet of the subcooling heat exchanger 47 toward the third connection pipe 7 has a degree of subcooling at a predetermined value. The bypass expansion valve 46a is controlled into the closed state. In the utilization units 3a, 3b, and 3c, the utilization expansion valves 51a, 51b, and 51c are each controlled in opening degree.

In the secondary refrigerant circuit 10 in this state, a secondary high-pressure refrigerant compressed in and discharged from the secondary compressor 21 is sent to the secondary flow path 35a of the cascade heat exchanger 35 via the secondary switching mechanism 22. The secondary high-pressure refrigerant flowing in the secondary flow path 35a of the cascade heat exchanger 35 radiates heat, and the primary refrigerant flowing in the primary flow path 35b of the cascade heat exchanger 35 is evaporated. The secondary refrigerant having radiated heat in the cascade heat exchanger 35 passes the heat source expansion valve 36 controlled in opening degree, and then flows into the receiver 45. Part of the refrigerant having flowed out of the receiver 45 is branched into the subcooling circuit 48, is decompressed at the subcooling expansion valve 48a, and then joins the suction flow path 23. In the subcooling heat exchanger 47, part of the remaining refrigerant having flowed out of the receiver 45 is cooled by the refrigerant flowing in the subcooling circuit 48, and is then sent to the third connection pipe 7 via the third shutoff valve 31.

The refrigerant sent to the third connection pipe 7 is branched into three portions to pass the third branching pipes 61a, 61b, and 61c of the first to third branching units 6a, 6b, and 6c. Thereafter, the refrigerant having flowed in the second connecting tubes 16a, 16b, and 16c is sent to the second utilization pipes 56a, 56b, and 56c of the first to third utilization units 3a, 3b, and 3c. The refrigerant sent to the second utilization pipes 56a, 56b, and 56c is sent to the utilization expansion valves 51a, 51b, and 51c in the utilization units 3a, 3b, and 3c.

The refrigerant having passed the utilization expansion valves 51a, 51b, and 51c each controlled in opening degree exchanges heat with indoor air supplied by the indoor fans 53a, 53b, and 53c in the utilization heat exchangers 52a, 52b, and 52c. The refrigerant flowing in the utilization heat exchangers 52a, 52b, and 52c is thus evaporated into a low-pressure gas refrigerant. Indoor air is cooled and is supplied into the indoor space. The indoor space is thus cooled. The low-pressure gas refrigerant evaporated in the utilization heat exchangers 52a, 52b, and 52c flows in the first utilization pipes 57a, 57b, and 57c, flows in the first connecting tubes 15a, 15b, and 15c, and is then sent to the junction pipes 62a, 62b, and 62c of the first to third branching units 6a, 6b, and 6c.

The low-pressure gas refrigerant sent to the junction pipes 62a, 62b, and 62c is branched into the first branching pipes 63a, 63b, and 63c, and the second branching pipes 64a, 64b, and 64c. The refrigerant having passed the first control valves 66a, 66b, and 66c on the first branching pipes 63a, 63b, and 63c is sent to the first connection pipe 8. The refrigerant having passed the second control valves 67a, 67b, and 67c on the second branching pipes 64a, 64b, and 64c is sent to the second connection pipe 9.

The low-pressure gas refrigerant sent to the first connection pipe 8 and the second connection pipe 9 is returned to the suction side of the secondary compressor 21 via the first shutoff valve 32, the second shutoff valve 33, the first heat source pipe 28, the second heat source pipe 29, the secondary switching mechanism 22, the suction flow path 23, and the accumulator 30.

Behavior during cooling operation is executed in this manner.

(9-2) Heating Operation

Figure 4:
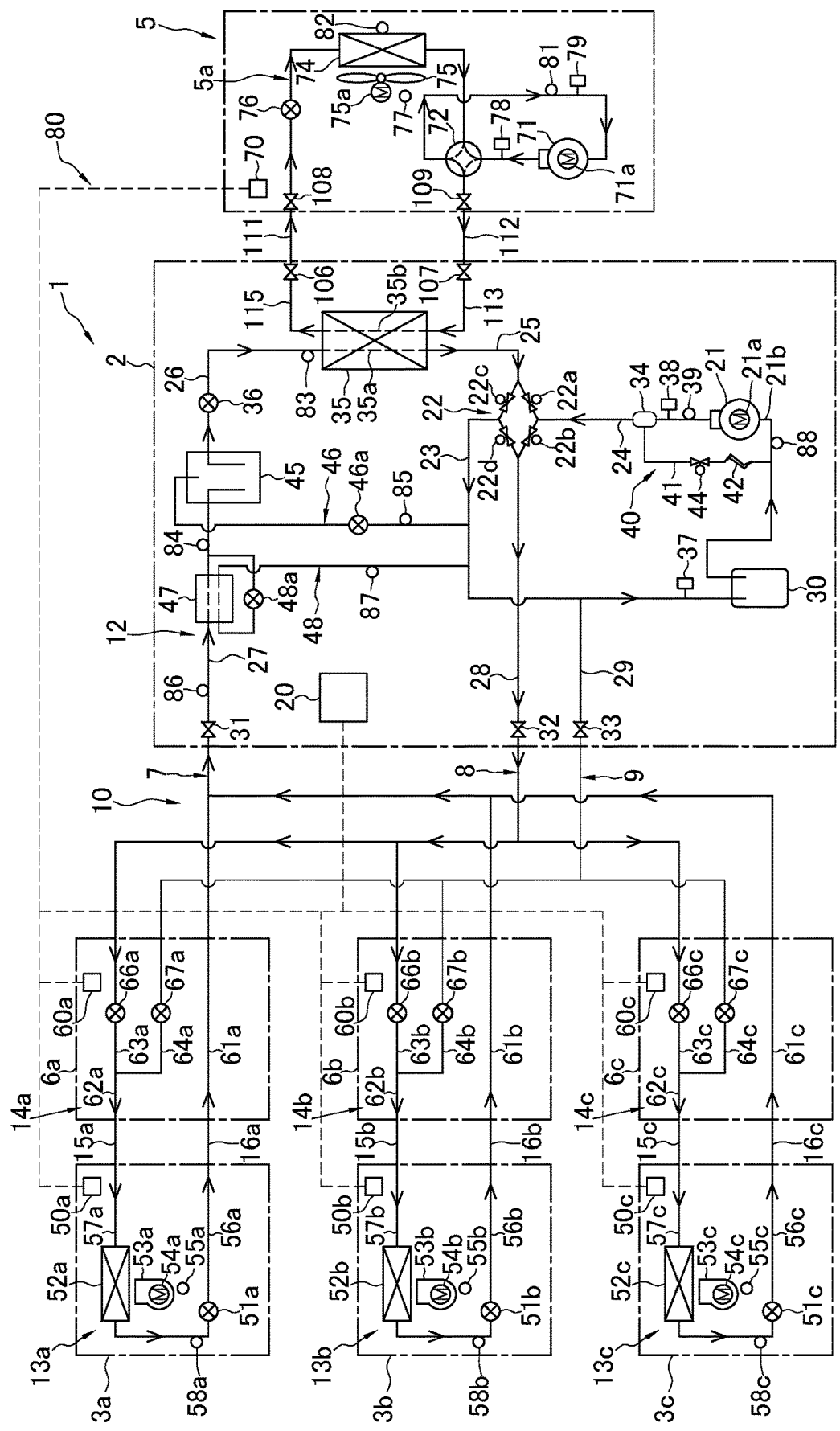
FIG. 4 is a view indicating behavior (a refrigerant flow) during heating operation of the refrigeration cycle system.

During heating operation, each of the utilization heat exchangers 52a, 52b, and 52c in the utilization units 3a, 3b, and 3c functions as a refrigerant radiator. Furthermore, during heating operation, the cascade heat exchanger 35 functions as an evaporator for the secondary refrigerant. During heating operation, the primary refrigerant circuit 5a and the secondary refrigerant circuit 10 in the refrigeration cycle system 1 are configured as depicted in FIG. 4. FIG. 4 includes arrows provided to the primary refrigerant circuit 5a and arrows provided to the secondary refrigerant circuit 10, which indicate refrigerant flows during heating operation.

Specifically, in the primary unit 5, the primary switching mechanism 72 is switched into a sixth connection state to cause the cascade heat exchanger 35 to function as a radiator for the primary refrigerant. The sixth connection state of the primary switching mechanism 72 corresponds to a connection state depicted by broken lines in the primary switching mechanism 72 in FIG. 4. Accordingly in the primary unit 5, the primary refrigerant discharged from the primary compressor 71 passes the primary switching mechanism 72 and flows in the primary flow path 35b of the cascade heat exchanger 35 to be condensed. The primary refrigerant condensed in the cascade heat exchanger 35 is decompressed at the primary expansion valve 76, then exchanges heat with outdoor air supplied from the primary fan 75 in the primary heat exchanger 74 to be evaporated, and is sucked into the primary compressor 71 via the primary switching mechanism 72.

In the heat source unit 2, the secondary switching mechanism 22 is switched into the second connection state as well as the third connection state. The cascade heat exchanger 35 thus functions as an evaporator for the secondary refrigerant. In the second connection state of the secondary switching mechanism 22, the first switching valve 22a is in the closed state and the third switching valve 22c is in the opened state. In the third connection state of the secondary switching mechanism 22, the second switching valve 22b is in the opened state and the fourth switching valve 22d is in the closed state. The heat source expansion valve 36 is controlled in opening degree. In the first to third branching units 6a, 6b, and 6c, the first control valves 66a, 66b, and 66c are controlled into the opened state, and the second control valves 67a, 67b, and 67c are controlled into the closed state. Accordingly, each of the utilization heat exchangers 52a, 52b, and 52c in the utilization units 3a, 3b, and 3c functions as a refrigerant radiator. The utilization heat exchangers 52a, 52b, and 52c in the utilization units 3a, 3b, and 3c and the discharge side of the secondary compressor 21 in the heat source unit 2 are connected via the discharge flow path 24, the first heat source pipe 28, the first connection pipe 8, the first branching pipes 63a, 63b, and 63c, the junction pipes 62a, 62b, and 62c, the first connecting tubes 15a, 15b, and 15c, and the first utilization pipes 57a, 57b, and 57c. The subcooling expansion valve 48a and the bypass expansion valve 46a are controlled into the closed state. In the utilization units 3a, 3b, and 3c, the utilization expansion valves 51a, 51b, and 51c are each controlled in opening degree.

In the secondary refrigerant circuit 10 in this state, a high-pressure refrigerant compressed in and discharged from the secondary compressor 21 is sent to the first heat source pipe 28 via the second switching valve 22b controlled into the opened state in the secondary switching mechanism 22. The refrigerant sent to the first heat source pipe 28 is sent to the first connection pipe 8 via the first shutoff valve 32.

The high-pressure refrigerant sent to the first connection pipe 8 is branched into three portions to be sent to the first branching pipes 63a, 63b, and 63c in the utilization units 3a, 3b, and 3c in operation. The high-pressure refrigerant sent to the first branching pipes 63a, 63b, and 63c passes the first control valves 66a, 66b, and 66c, and flows in the junction pipes 62a, 62b, and 62c. The refrigerant having flowed in the first connecting tubes 15a, 15b, and 15c and the first utilization pipes 57a, 57b, and 57c is then sent to the utilization heat exchangers 52a, 52b, and 52c.

The high-pressure refrigerant sent to the utilization heat exchangers 52a, 52b, and 52c exchanges heat with indoor air supplied by the indoor fans 53a, 53b, and 53c in the utilization heat exchangers 52a, 52b, and 52c. The refrigerant flowing in the utilization heat exchangers 52a, 52b, and 52c thus radiates heat. Indoor air is heated and is supplied into the indoor space. The indoor space is thus heated. The refrigerant having radiated heat in the utilization heat exchangers 52a, 52b, and 52c flows in the second utilization pipes 56a, 56b, and 56c and passes the utilization expansion valves 51a, 51b, and 51c each controlled in opening degree. Thereafter, the refrigerant having flowed in the second connecting tubes 16a, 16b, and 16c flows in the third branching pipes 61a, 61b, and 61c of the branching units 6a, 6b, and 6c.

The refrigerant sent to the third branching pipes 61a, 61b, and 61c is sent to the third connection pipe 7 to join.

The refrigerant sent to the third connection pipe 7 is sent to the heat source expansion valve 36 via the third shutoff valve 31. The refrigerant sent to the heat source expansion valve 36 is controlled in flow rate at the heat source expansion valve 36 and is then sent to the cascade heat exchanger 35. In the cascade heat exchanger 35, the secondary refrigerant flowing in the secondary flow path 35a is evaporated into a low-pressure gas refrigerant and is sent to the secondary switching mechanism 22, and the primary refrigerant flowing in the primary flow path 35b of the cascade heat exchanger 35 is condensed. The secondary low-pressure gas refrigerant sent to the secondary switching mechanism 22 is returned to the suction side of the secondary compressor 21 via the suction flow path 23 and the accumulator 30.

Behavior during heating operation is executed in this manner.

(9-3) Mainly Cooling Operation

Figure 5:
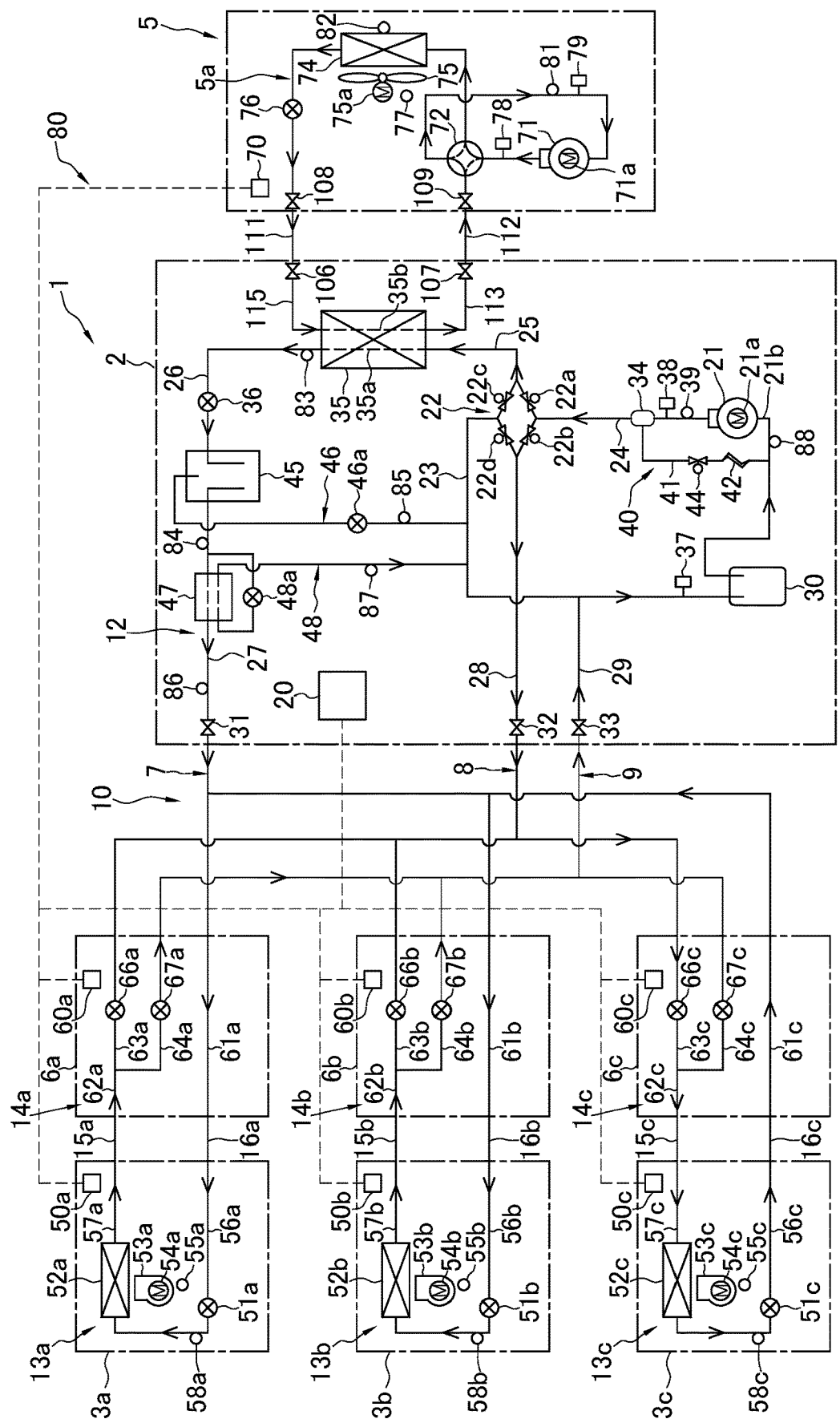
FIG. 5 is a view indicating behavior (a refrigerant flow) during simultaneous cooling and heating operation (mainly cooling) of the refrigeration cycle system.

During mainly cooling operation, for example, the utilization heat exchangers 52a and 52b in the utilization units 3a and 3b each function as a refrigerant evaporator, and the utilization heat exchanger 52c in the utilization unit 3c functions as a refrigerant radiator. During mainly cooling operation, the cascade heat exchanger 35 functions as a radiator for the secondary refrigerant. During mainly cooling operation, the primary refrigerant circuit 5a and the secondary refrigerant circuit 10 in the refrigeration cycle system 1 are configured as depicted in FIG. 5. FIG. 5 includes arrows provided to the primary refrigerant circuit 5a and arrows provided to the secondary refrigerant circuit 10, which indicate refrigerant flows during mainly cooling operation.

Specifically, in the primary unit 5, the primary switching mechanism 72 is switched into the fifth connection state (the state depicted by solid lines in the primary switching mechanism 72 in FIG. 5) to cause the cascade heat exchanger 35 to function as an evaporator for the primary refrigerant. Accordingly in the primary unit 5, the primary refrigerant discharged from the primary compressor 71 passes the primary switching mechanism 72 and exchanges heat with outdoor air supplied from the primary fan 75 in the primary heat exchanger 74 to be condensed. The primary refrigerant condensed in the primary heat exchanger 74 is decompressed at the primary expansion valve 76, then flows in the primary flow path 35b of the cascade heat exchanger 35 to be evaporated, and is sucked into the primary compressor 71 via the primary switching mechanism 72.

In the heat source unit 2, the secondary switching mechanism 22 is switched into the first connection state (the first switching valve 22a is in the opened state and the third switching valve 22c is in the closed state) as well as the third connection state (the second switching valve 22b is in the opened state and the fourth switching valve 22d is in the closed state) to cause the cascade heat exchanger 35 to function as a radiator for the secondary refrigerant. The heat source expansion valve 36 is controlled in opening degree. In the first to third branching units 6a, 6b, and 6c, the first control valve 66c and the second control valves 67a and 67b are controlled into the opened state, and the first control valves 66a and 66b and the second control valve 67c are controlled into the closed state. Accordingly, the utilization heat exchangers 52a and 52b in the utilization units 3a and 3b each function as a refrigerant evaporator, and the utilization heat exchanger 52c in the utilization unit 3c functions as a refrigerant radiator. The utilization heat exchangers 52a and 52b in the utilization units 3a and 3b and the suction side of the secondary compressor 21 in the heat source unit 2 are connected via the second connection pipe 9, and the utilization heat exchanger 52c in the utilization unit 3c and the discharge side of the secondary compressor 21 in the heat source unit 2 are connected via the first connection pipe 8. The subcooling expansion valve 48a is controlled in opening degree such that the secondary refrigerant flowing at the outlet of the subcooling heat exchanger 47 toward the third connection pipe 7 has a degree of subcooling at the predetermined value. The bypass expansion valve 46a is controlled into the closed state. In the utilization units 3a, 3b, and 3c, the utilization expansion valves 51a, 51b, and 51c are each controlled in opening degree.

In the secondary refrigerant circuit 10 in this state, part of the secondary high-pressure refrigerant compressed in and discharged from the secondary compressor 21 is sent to the first connection pipe 8 via the secondary switching mechanism 22, the first heat source pipe 28, and the first shutoff valve 32, and the remaining is sent to the secondary flow path 35a of the cascade heat exchanger 35 via the secondary switching mechanism 22 and the third heat source pipe 25.

The high-pressure refrigerant sent to the first connection pipe 8 is sent to the first branching pipe 63c. The high-pressure refrigerant sent to the first branching pipe 63c is sent to the utilization heat exchanger 52c in the utilization unit 3c via the first control valve 66c and the junction pipe 62c.

The high-pressure refrigerant sent to the utilization heat exchanger 52c exchanges heat with indoor air supplied by the indoor fan 53c in the utilization heat exchanger 52c. The refrigerant flowing in the utilization heat exchanger 52c thus radiates heat. Indoor air is heated and is supplied into the indoor space, and the utilization unit 3c executes heating operation. The refrigerant having radiated heat in the utilization heat exchanger 52c flows in the second utilization pipe 56c and is controlled in flow rate at the utilization expansion valve 51c. The refrigerant having flowed in the second connecting tube 16c is sent to the third branching pipe 61c in the branching unit 6c.

The refrigerant sent to the third branching pipe 61c is sent to the third connection pipe 7.

The high-pressure refrigerant sent to the secondary flow path 35a of the cascade heat exchanger 35 exchanges heat with the primary refrigerant flowing in the primary flow path 35b in the cascade heat exchanger 35 to radiate heat. The secondary refrigerant having radiated heat in the cascade heat exchanger 35 is controlled in flow rate at the heat source expansion valve 36 and then flows into the receiver 45. Part of the refrigerant having flowed out of the receiver 45 is branched into the subcooling circuit 48, is decompressed at the subcooling expansion valve 48a, and then joins the suction flow path 23. In the subcooling heat exchanger 47, part of the remaining refrigerant having flowed out of the receiver 45 is cooled by the refrigerant flowing in the subcooling circuit 48, is then sent to the third connection pipe 7 via the third shutoff valve 31, and joins the refrigerant having radiated heat in the utilization heat exchanger 52c.

The refrigerant having joined in the third connection pipe 7 is branched into two portions to be sent to the third branching pipes 61a and 61b of the branching units 6a and 6b. Thereafter, the refrigerant having flowed in the second connecting tubes 16a and 16b is sent to the second utilization pipes 56a and 56b of the first and second utilization units 3a and 3b. The refrigerant flowing in the second utilization pipes 56a and 56b passes the utilization expansion valves 51a and 51b in the utilization units 3a and 3b.

The refrigerant having passed the utilization expansion valves 51a and 51b each controlled in opening degree exchanges heat with indoor air supplied by the indoor fans 53a and 53b in the utilization heat exchangers 52a and 52b. The refrigerant flowing in the utilization heat exchangers 52a and 52b is thus evaporated into a low-pressure gas refrigerant. Indoor air is cooled and is supplied into the indoor space. The indoor space is thus cooled. The low-pressure gas refrigerant evaporated in the utilization heat exchangers 52a and 52b is sent to the junction pipes 62a and 62b of the first and second branching units 6a and 6b.

The low-pressure gas refrigerant sent to the junction pipes 62a and 62b is sent to the second connection pipe 9 via the second control valves 67a and 67b and the second branching pipes 64a and 64b, to join.

The low-pressure gas refrigerant sent to the second connection pipe 9 is returned to the suction side of the secondary compressor 21 via the second shutoff valve 33, the second heat source pipe 29, the suction flow path 23, and the accumulator 30.

Behavior during mainly cooling operation is executed in this manner.

(9-4) Mainly Heating Operation

Figure 6:
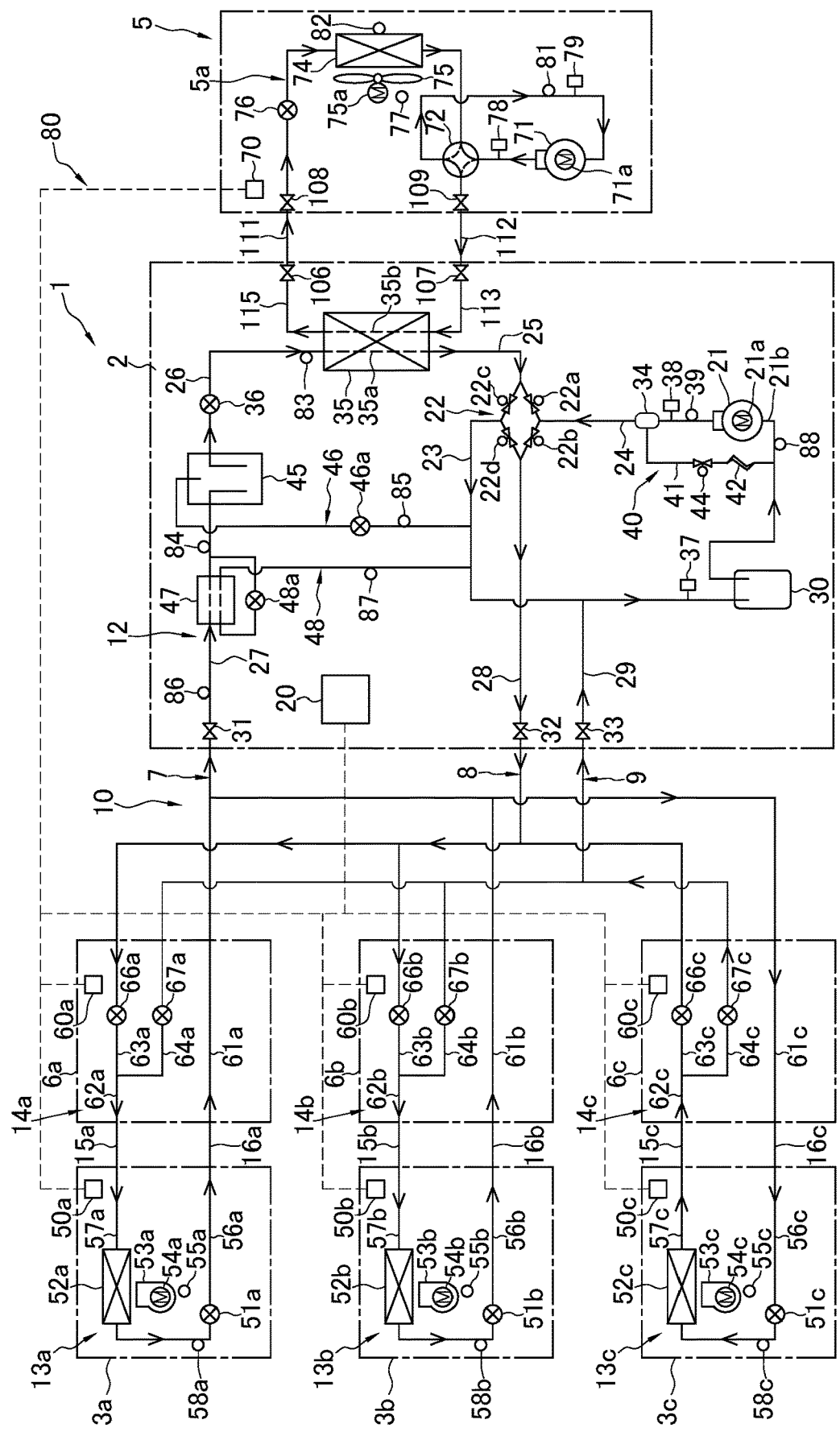
FIG. 6 is a view indicating behavior (a refrigerant flow) during simultaneous cooling and heating operation (mainly heating) of the refrigeration cycle system.

During mainly heating operation, for example, the utilization heat exchangers 52a and 52b in the utilization units 3a and 3b each function as a refrigerant radiator, and the utilization heat exchanger 52c functions as a refrigerant evaporator. During mainly heating operation, the cascade heat exchanger 35 functions as an evaporator for the secondary refrigerant. During mainly heating operation, the primary refrigerant circuit 5a and the secondary refrigerant circuit 10 in the refrigeration cycle system 1 are configured as depicted in FIG. 6. FIG. 6 includes arrows provided to the primary refrigerant circuit 5a and arrows provided to the secondary refrigerant circuit 10, which indicate refrigerant flows during mainly heating operation.

Specifically, in the primary unit 5, the primary switching mechanism 72 is switched into the sixth connection state to cause the cascade heat exchanger 35 to function as a radiator for the primary refrigerant. The sixth connection state of the primary switching mechanism 72 corresponds to a connection state depicted by broken lines in the primary switching mechanism 72 in FIG. 6. Accordingly in the primary unit 5, the primary refrigerant discharged from the primary compressor 71 passes the primary switching mechanism 72 and flows in the primary flow path 35b of the cascade heat exchanger 35 to be condensed. The primary refrigerant condensed in the cascade heat exchanger 35 is decompressed at the primary expansion valve 76, then exchanges heat with outdoor air supplied from the primary fan 75 in the primary heat exchanger 74 to be evaporated, and is sucked into the primary compressor 71 via the primary switching mechanism 72.

In the heat source unit 2, the secondary switching mechanism 22 is switched into the second connection state as well as the third connection state. In the second connection state of the secondary switching mechanism 22, the first switching valve 22a is in the closed state and the third switching valve 22c is in the opened state. In the third connection state of the secondary switching mechanism 22, the second switching valve 22b is in the opened state and the fourth switching valve 22d is in the closed state. The cascade heat exchanger 35 thus functions as an evaporator for the secondary refrigerant. The heat source expansion valve 36 is controlled in opening degree. In the first to third branching units 6a, 6b, and 6c, the first control valves 66a and 66b and the second control valve 67c are controlled into the opened state, and the first control valve 66c and the second control valves 67a and 67b are controlled into the closed state. Accordingly, the utilization heat exchangers 52a and 52b in the utilization units 3a and 3b each function as a refrigerant radiator, and the utilization heat exchanger 52c in the utilization unit 3c functions as a refrigerant evaporator. The utilization heat exchanger 52c in the utilization unit 3c and the suction side of the secondary compressor 21 in the heat source unit 2 are connected via the first utilization pipe 57c, the first connecting tube 15c, the junction pipe 62c, the second branching pipe 64c, and the second connection pipe 9. The utilization heat exchangers 52a and 52b in the utilization units 3a and 3b and the discharge side of the secondary compressor 21 in the heat source unit 2 are connected via the discharge flow path 24, the first heat source pipe 28, the first connection pipe 8, the first branching pipes 63a and 63b, the junction pipes 62a and 62b, the first connecting tubes 15a and 15b, and the first utilization pipes 57a and 57b. The subcooling expansion valve 48a and the bypass expansion valve 46a are controlled into the closed state. In the utilization units 3a, 3b, and 3c, the utilization expansion valves 51a, 51b, and 51c are each controlled in opening degree.

In the secondary refrigerant circuit 10 in this state, a secondary high-pressure refrigerant compressed in and discharged from the secondary compressor 21 is sent to the first connection pipe 8 via the secondary switching mechanism 22, the first heat source pipe 28, and the first shutoff valve 32.

The high-pressure refrigerant sent to the first connection pipe 8 is branched into two portions to be sent to the first branching pipes 63a and 63b of the first branching unit 6a and the second branching unit 6b connected to the first utilization unit 3a and the second utilization unit 3b in operation. The high-pressure refrigerant sent to the first branching pipes 63a and 63b is sent to the utilization heat exchangers 52a and 52b in the first utilization unit 3a and the second utilization unit 3b via the first control valves 66a and 66b, the junction pipes 62a and 62b, and the first connecting tubes 15a and 15b.

The high-pressure refrigerant sent to the utilization heat exchangers 52a and 52b exchanges heat with indoor air supplied by the indoor fans 53a and 53b in the utilization heat exchangers 52a and 52b. The refrigerant flowing in the utilization heat exchangers 52a and 52b thus radiates heat. Indoor air is heated and is supplied into the indoor space. The indoor space is thus heated. The refrigerant having radiated heat in the utilization heat exchangers 52a and 52b flows in the second utilization pipes 56a and 56b, and passes the utilization expansion valves 51a and 51b each controlled in opening degree. Thereafter, the refrigerant having flowed in the second connecting tubes 16a and 16b is sent to the third connection pipe 7 via the third branching pipes 61a and 61b of the branching units 6a and 6b.

Part of the refrigerant sent to the third connection pipe 7 is sent to the third branching pipe 61c of the branching unit 6c, and the remaining is sent to the heat source expansion valve 36 via the third shutoff valve 31.

The refrigerant sent to the third branching pipe 61c flows in the second utilization pipe 56c of the utilization unit 3c via the second connecting tube 16c, and is sent to the utilization expansion valve 51c.

The refrigerant having passed the utilization expansion valve 51c controlled in opening degree exchanges heat with indoor air supplied by the indoor fan 53c in the utilization heat exchanger 52c. The refrigerant flowing in the utilization heat exchanger 52c is thus evaporated into a low-pressure gas refrigerant. Indoor air is cooled and is supplied into the indoor space. The indoor space is thus cooled. The low-pressure gas refrigerant evaporated in the utilization heat exchanger 52c passes the first utilization pipe 57c and the first connecting tube 15c to be sent to the junction pipe 62c.

The low-pressure gas refrigerant sent to the junction pipe 62c is sent to the second connection pipe 9 via the second control valve 67c and the second branching pipe 64c.

The low-pressure gas refrigerant sent to the second connection pipe 9 is returned to the suction side of the secondary compressor 21 via the second shutoff valve 33, the second heat source pipe 29, the suction flow path 23, and the accumulator 30.

The refrigerant sent to the heat source expansion valve 36 passes the heat source expansion valve 36 controlled in opening degree, and then exchanges heat with the primary refrigerant flowing in the primary flow path 35b in the secondary flow path 35a of the cascade heat exchanger 35. The refrigerant flowing in the secondary flow path 35a of the cascade heat exchanger 35 is evaporated into a low-pressure gas refrigerant and is sent to the secondary switching mechanism 22. The low-pressure gas refrigerant sent to the secondary switching mechanism 22 joins the low-pressure gas refrigerant evaporated in the utilization heat exchanger 52c on the suction flow path 23. The refrigerant thus joined is returned to the suction side of the secondary compressor 21 via the accumulator 30.

Behavior during mainly heating operation is executed in this manner.

(10) Heat Storing Operation and Defrosting Operation

Figure 7:
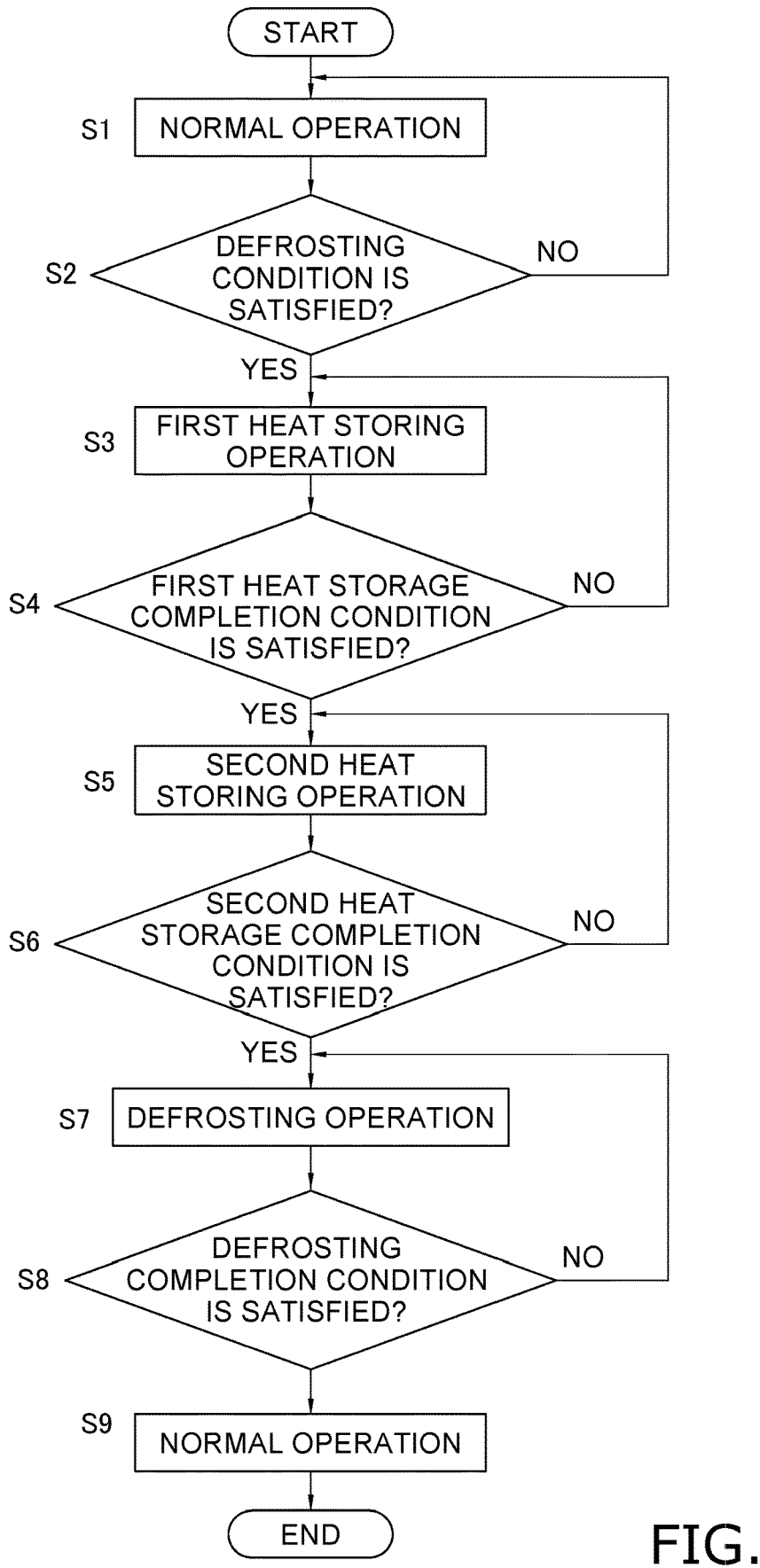
FIG. 7 is an activation control flowchart of the refrigeration cycle system.

In the refrigeration cycle system 1, heat storing operation and defrosting operation are executed when the predetermined condition is satisfied during normal operation of heating operation or mainly heating operation. Heat storing operation and defrosting operation will be described hereinafter with reference to a flowchart in FIG. 7.

Described herein is a process flow from execution of heat storing operation and defrosting operation subsequent to heating operation or mainly heating operation, and then returning to heating operation or mainly heating operation.

In step S1, the control unit 80 controls various devices such that the refrigeration cycle system 1 executes normal operation of heating operation or mainly heating operation.

In step S2, the control unit 80 determines whether or not a predetermined defrosting condition is satisfied regarding adhesion of frost to the primary heat exchanger 74. The defrosting condition is not limited, and determination can be made in accordance with at least one of conditions such as outdoor air temperature is equal to or less than a predetermined value, predetermined time has elapsed from completion of last defrosting operation, temperature of the primary heat exchanger 74 is equal to or less than a predetermined value, and evaporation pressure or evaporation temperature of the primary refrigerant is equal to or less than a predetermined value. The flow transitions to step S3 if the defrosting condition is satisfied. Step S2 is repeated if the defrosting condition is not satisfied.

In step S3, the control unit 80 starts first heat storing operation exemplifying heat storing operation.

During first heat storing operation, the control unit 80 executes various control as follows. The refrigerant flow during first heat storing operation is similar to the refrigerant flow during heating operation depicted in FIG. 4.

As to the primary refrigerant circuit 5a, the control unit 80 keeps the primary switching mechanism 72 in the connection state of normal operation, keeps the primary fan 75 in an operating state, and continuously drives the primary compressor 71. The primary refrigerant thus flows in the order of the primary compressor 71, the cascade heat exchanger 35, the primary expansion valve 76, and the primary heat exchanger 74. The control unit 80 further controls a valve opening degree of the primary expansion valve 76 such that the refrigerant sucked into the primary compressor 71 has a degree of superheating at a predetermined value. Alternatively, the control unit 80 may control to increase a drive frequency of the primary compressor 71 so as to be higher than the drive frequency during normal operation, or may control the drive frequency of the primary compressor 71 to a predetermined maximum frequency.

As to the secondary refrigerant circuit 10, the control unit 80 stops the indoor fans 53a, 53b, and 53c. Upon transition from heating operation to first heat storing operation, the control unit 80 keeps the connection state of the secondary switching mechanism 22, keeps the utilization expansion valves 51a, 51b, and 51c and the first control valves 66a, 66b, and 66c in the opened state, and keeps the second control valves 67a, 67b, and 67c, the subcooling expansion valve 48a, and the bypass expansion valve 46a in the closed state. Upon transition from mainly heating operation to first heat storing operation, the control unit 80 keeps the connection state of the secondary switching mechanism 22, controls the utilization expansion valves 51a, 51b, and 51c and the first control valves 66a, 66b, and 66c into the opened state, and controls the second control valves 67a, 67b, and 67c, the subcooling expansion valve 48a, and the bypass expansion valve 46a into the closed state. The secondary refrigerant thus flows in the order of the secondary compressor 21, the utilization heat exchangers 52a, 52b, and 52c, the utilization expansion valves 51a, 51b, and 51c, and the cascade heat exchanger 35. The control unit 80 controls a valve opening degree of the heat source expansion valve 36 such that the refrigerant sucked into the secondary compressor 21 has a degree of superheating at a predetermined value. Alternatively, the secondary compressor 21 may keep driven, or may be controlled to have a higher drive frequency in comparison to normal operation.

In step S4, the control unit 80 determines whether or not a first heat storage completion condition is satisfied. The first heat storage completion condition is not limited in this case, and determination can be made in accordance with at least one of conditions such as predetermined time has elapsed from the start of first heat storing operation, the cascade heat exchanger 35 has temperature equal to or more than a predetermined value, the secondary refrigerant discharged from the secondary compressor 21 has pressure equal to or more than a predetermined value, the secondary refrigerant discharged from the secondary compressor 21 has temperature equal to or more than a predetermined value, and the secondary refrigerant at a predetermined site having a flow of a liquid refrigerant on the secondary refrigerant circuit 10 has temperature equal to or more than a predetermined value. The flow transitions to step S5 if the first heat storage completion condition is satisfied. Step S3 is repeated if the first heat storage completion condition is not satisfied.

In step S5, the control unit 80 ends first heat storing operation, switches the secondary switching mechanism 22 into the first connection state as well as the fourth connection state after executing pressure equalizing behavior at the secondary refrigerant circuit 10, controls the utilization expansion valves 51a, 51b, and 51c into the closed state, and starts second heat storing operation as heat storing operation. Alternatively, the first control valves 66a, 66b, and 66c and the second control valves 67a, 67b, and 67c may be controlled into the closed state in this case.

Figure 8:
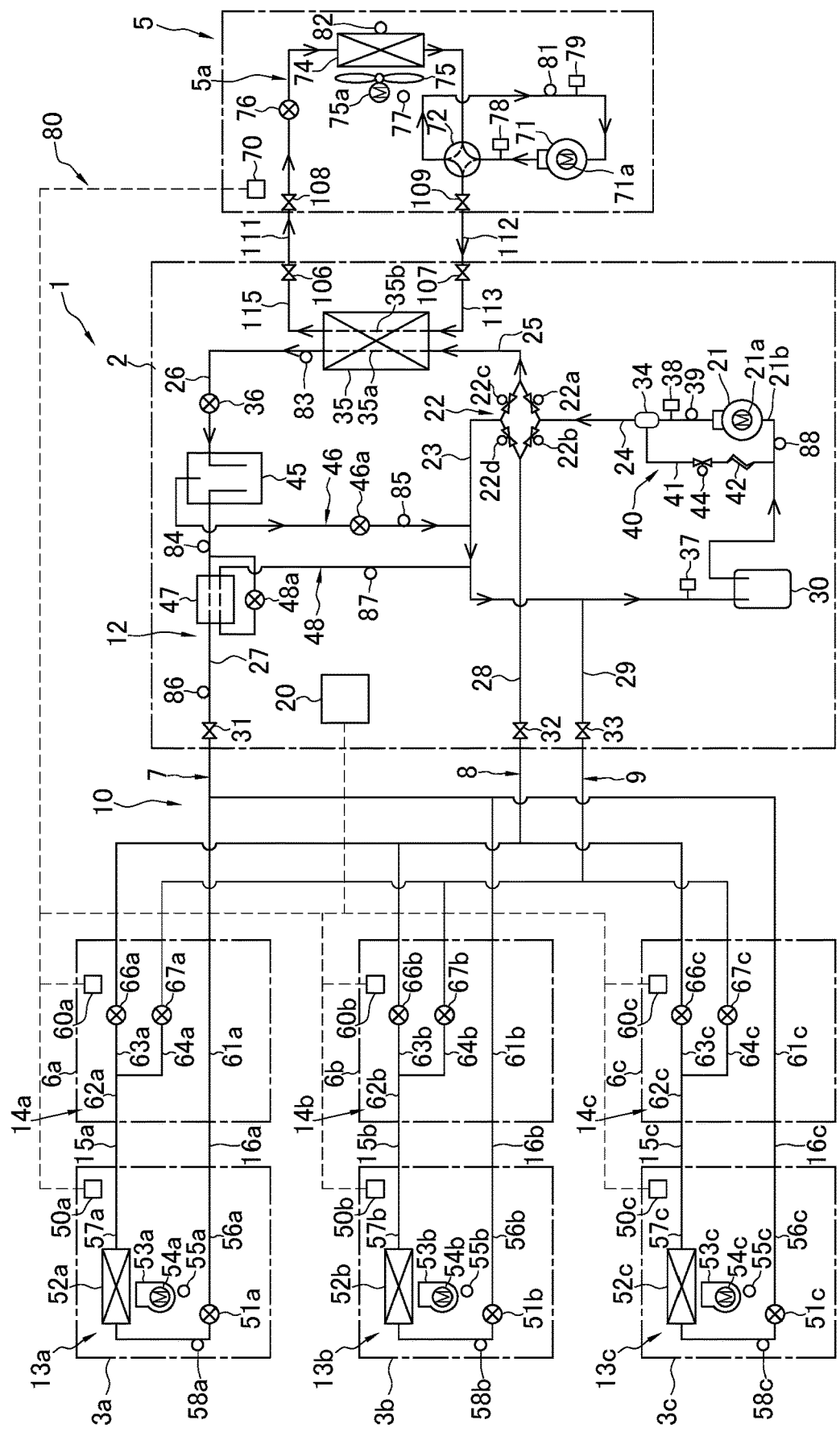
FIG. 8 is a view indicating behavior (a refrigerant flow) during second heat storing operation of the refrigeration cycle system.

During second heat storing operation, the control unit 80 executes various control as follows. FIG. 8 indicates a refrigerant flow during second heat storing operation.

As to the primary refrigerant circuit 5a, the control unit 80 keeps operation similar to first heat storing operation.

As to the secondary refrigerant circuit 10, the control unit 80 switches the secondary switching mechanism 22 into the first connection state as well as the fourth connection state with the indoor fans 53a, 53b, and 53c being kept stopped, and drives the secondary compressor 21 while controlling the utilization expansion valves 51a, 51b, and 51c, the first control valves 66a, 66b, and 66c, the second control valves 67a, 67b, and 67c, and the subcooling expansion valve 48a into the opened state and controlling the bypass expansion valve 46a into the opened state The secondary refrigerant thus flows in the order of the secondary compressor 21, the cascade heat exchanger 35, the receiver 45, the bypass circuit 46, and the bypass expansion valve 46a. The heat source expansion valve 36 is controlled into a fully opened state. The control unit 80 controls the drive frequency such that a high pressure refrigerant and a low pressure refrigerant at the secondary refrigerant circuit 10 have differential pressure secured to be equal to or more than a predetermined value in the secondary compressor 21. The control unit 80 controls a valve opening degree of the bypass expansion valve 46a in accordance with temperature of the cascade heat exchanger 35 and a degree of superheating of the refrigerant discharged from the secondary compressor 21. Specifically, the control unit 80 controls to increase the valve opening degree such that the secondary refrigerant has a secured flow in the cascade heat exchanger 35 and the cascade heat exchanger 35 has temperature kept equal to or more than a predetermined value, and controls to decrease the valve opening degree such that the refrigerant discharged from the secondary compressor 21 has a degree of superheating kept equal to or more than a predetermined value to prevent a wet state of the secondary refrigerant sucked into the secondary compressor 21, so as to control the valve opening degree of the bypass expansion valve 46a.

In step S6, the control unit 80 determines whether or not a second heat storage completion condition is satisfied. The second heat storage completion condition is not limited in this case, and determination can be made in accordance with at least one of conditions such as predetermined time has elapsed from the start of second heat storage operation, the secondary refrigerant discharged from the secondary compressor 21 has pressure equal to or more than a predetermined value, the secondary refrigerant discharged from the secondary compressor 21 has temperature equal to or more than a predetermined value, the primary refrigerant discharged from the primary compressor 71 has pressure equal to or more than a predetermined value, the primary refrigerant discharged from the primary compressor 71 has temperature equal to or more than a predetermined value, and the cascade heat exchanger 35 has temperature equal to or more than a predetermined value. The control unit 80 may alternatively determine that the second heat storage completion condition is satisfied if the primary control unit 70 configured to control the primary refrigerant circuit 5a determines completion of preparation for starting defrosting operation at the primary refrigerant circuit 5a. The flow transitions to step S7 if the second heat storage completion condition is satisfied. Step S5 is repeated if the second heat storage completion condition is not satisfied.

In step S7, the control unit 80 ends second heat storing operation and starts defrosting operation.

Figure 9:
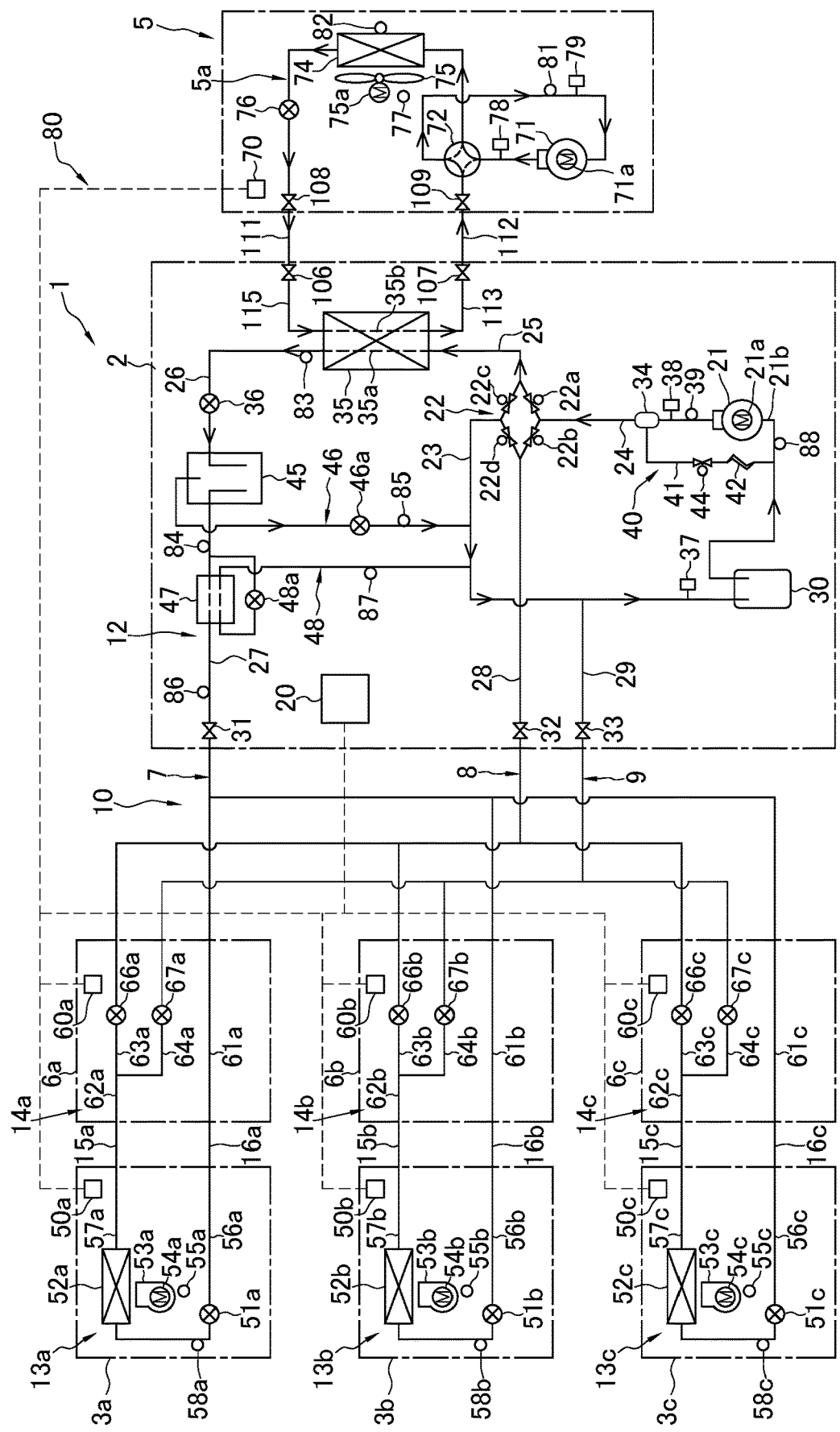
FIG. 9 is a view indicating behavior (a refrigerant flow) during defrosting operation of the refrigeration cycle system.

During defrosting operation, the control unit 80 executes various control as follows. FIG. 9 indicates a refrigerant flow during defrosting operation.

As to the primary refrigerant circuit 5a, the control unit 80 switches the primary switching mechanism 72 into the fifth connection state after executing pressure equalizing behavior at the primary refrigerant circuit 5a, and drives the primary compressor 71 while keeping the primary fan 75 stopped. The primary refrigerant thus flows in the order of the primary compressor 71, the primary heat exchanger 74, the primary expansion valve 76, and the cascade heat exchanger 35. The control unit 80 controls the valve opening degree of the primary expansion valve 76 such that the degree of superheating of the refrigerant sucked into the primary compressor 71 is kept at the predetermined value. Alternatively, the control unit 80 may control to increase the drive frequency of the primary compressor 71 so as to be higher than the drive frequency during normal operation, or may control the drive frequency of the primary compressor 71 to the predetermined maximum frequency.

As to the secondary refrigerant circuit 10, the control unit 80 keeps control for second heat storing operation.

In step S8, the control unit 80 determines whether or not a defrosting completion condition is satisfied. The defrosting completion condition is not limited, and determination can be made in accordance with at least one of conditions such as predetermined time has elapsed from the start of defrosting operation, the primary heat exchanger 74 has temperature equal to or more than a predetermined value, and condensation pressure or condensation temperature of the primary refrigerant is equal to or more than a predetermined value. The flow transitions to step S9 if the defrosting completion condition is satisfied. Step S7 is repeated if the defrosting completion condition is not satisfied.

In step S9, the control unit 80 controls various devices such that the refrigeration cycle system 1 returns to heating operation or mainly heating operation.

(11) Characteristics of Embodiment

The refrigeration cycle system 1 according to the present embodiment executes first heat storing operation and second heat storing operation as heat storing operation before starting defrosting operation.

During first heat storing operation, the secondary compressor 21 is driven with the indoor fans 53a, 53b, and 53c being stopped in the secondary refrigerant circuit 10. This inhibits heat release from the secondary refrigerant in the utilization heat exchangers 52a, 52b, and 52c, and enables heat storage in the secondary refrigerant circuit 10. In particular, the indoor fans 53a, 53b, and 53c are stopped, so that the secondary refrigerant having passed the utilization heat exchangers 52a, 52b, and 52c, with heat release being inhibited, reaches the secondary flow path 35a of the cascade heat exchanger 35 to enable heat storage in the cascade heat exchanger 35.

Furthermore, during second heat storing operation, the secondary refrigerant circuit 10 has circulation such that the bypass expansion valve 46a is opened to cause the secondary refrigerant to flow to the bypass circuit 46, with the utilization expansion valves 51a, 51b, and 51c being closed to stop supply of the secondary refrigerant to the utilization circuits 13a, 13b, and 13c. Accordingly, the utilization heat exchangers 52a, 52b, and 52c have inhibited temperature decrease while a high-temperature high-pressure refrigerant discharged from the secondary compressor 21 is supplied to the secondary flow path 35a of the cascade heat exchanger 35 to cause the cascade heat exchanger 35 to store heat, so as to inhibit deterioration of a utilization environment.

In the primary refrigerant circuit 5a during first heat storing operation and second heat storing operation, the high-temperature high-pressure refrigerant discharged from the primary compressor 71 is sent to the primary flow path 35b of the cascade heat exchanger 35. This also promotes heat storage at the cascade heat exchanger 35.

The refrigeration cycle system 1 according to the present embodiment accordingly achieves sufficient heat storage for melting frost at the primary heat exchanger 74 during defrosting operation prior to execution of the defrosting operation.

In the secondary refrigerant circuit 10 during defrosting operation, the cascade heat exchanger 35 can be supplied with heat by sending the high-temperature high-pressure refrigerant discharged from the secondary compressor 21 to the secondary flow path 35a of the cascade heat exchanger 35 while stopping supply of the secondary refrigerant to the utilization circuits 13a, 13b, and 13c. In the primary refrigerant circuit 5a, the primary refrigerant flowing in the primary flow path 35b of the cascade heat exchanger 35 can be provided with heat supplied from the secondary refrigerant to the cascade heat exchanger 35, and the primary compressor 71 can further pressurize the primary refrigerant thus provided with the heat in order to melt frost at the primary heat exchanger 74 by means of the refrigerant brought into the high-temperature high-pressure state. Frost at the primary heat exchanger 74 can thus be molten efficiently. This shortens time of deterioration of the utilization environment due to execution of defrosting operation.

During second heat storing operation and defrosting operation described above, the secondary refrigerant flows to the bypass circuit 46 extending from the gas phase region in the receiver 45 on the secondary refrigerant circuit 10. This allows the secondary refrigerant flowing in the bypass circuit 46 to principally become a gas refrigerant, so as to easily inhibit the refrigerant sucked into the secondary compressor 21 from coming into the wet state.

During second heat storing operation and defrosting operation described above, the valve opening degree of the bypass expansion valve 46a is controlled such that the cascade heat exchanger 35 has temperature kept equal to or more than a predetermined value and the refrigerant discharged from the secondary compressor 21 has a degree of superheating kept equal to or more than a predetermined value. Assuming that the secondary refrigerant has a stopped flow in the secondary flow path 35a of the cascade heat exchanger 35, the primary refrigerant evaporates at the primary flow path 35b of the cascade heat exchanger 35, so that heat keeps released from the secondary refrigerant stopped in the secondary flow path 35a. Accordingly, the secondary refrigerant is decreased in temperature in the secondary flow path 35a, and the cascade heat exchanger 35 is also decreased in temperature, to decrease heat used for melting frost at the primary heat exchanger 74 during defrosting operation. In contrast, the valve opening degree of the bypass expansion valve 46a is controlled such that temperature of the cascade heat exchanger 35 is kept equal to or more than a predetermined value, so as to inhibit the secondary refrigerant from being stopped in the secondary flow path 35a and secure sufficient heat for defrosting operation. Furthermore, the valve opening degree of the bypass expansion valve 46a is controlled to inhibit the wet state of the secondary refrigerant sucked into the secondary compressor 21. This sufficiently secures heat for defrosting operation and inhibits liquid compression in the secondary compressor 21.

In the refrigeration cycle system 1 according to the present embodiment, adoption of carbon dioxide as a refrigerant in the secondary refrigerant circuit 10 decreases the global warming potential (GWP). Even if the refrigerant containing no chlorofluorocarbon leaks on the utilization side, there is no outflow of chlorofluorocarbon on the utilization side.

The refrigeration cycle system 1 according to the present embodiment adopts the binary refrigeration cycle, to exhibit sufficient capacity at the secondary refrigerant circuit 10.

(12) Other Embodiments (12-1) Other Embodiment A

The above embodiment exemplifies execution of first heat storing operation and second heat storing operation as heat storing operation before starting defrosting operation.

For example, heat storing operation executed before the start of defrosting operation may alternatively include only first heat storing operation or only second heat storing operation.

When only first heat storing operation is executed as heat storing operation, defrosting operation according to the above embodiment may start upon satisfaction of the first heat storage completion condition. Alternatively, control of defrosting operation may start at the primary refrigerant circuit 5a after first heat storing operation ends and control of defrosting operation starts at the secondary refrigerant circuit 10. In other words, control of defrosting operation at the primary refrigerant circuit 5a may not start before control of defrosting operation at the secondary refrigerant circuit 10. In this case, in an exemplary case where the first heat storage completion condition is satisfied, the secondary switching mechanism 22 may be switched into the first connection state as well as the fourth connection state in the secondary refrigerant circuit 10, and the primary compressor 71 on the primary refrigerant circuit 5a may be stopped until the primary control unit 70 determines that preparation for the start of defrosting operation completes in the primary refrigerant circuit 5a. When the primary control unit 70 thereafter determines that preparation for the start of defrosting operation completes in the primary refrigerant circuit 5a, the secondary compressor 21 on the secondary refrigerant circuit 10 may be activated and the primary compressor 71 on the primary refrigerant circuit 5a may subsequently be activated. Pressure equalizing behavior at the primary refrigerant circuit 5a and switching the primary switching mechanism 72 into the fifth connection state may be executed after satisfaction of the first heat storage completion condition, or upon determination by the primary control unit 70 that preparation for the start of defrosting operation is completed in the primary refrigerant circuit 5a. The above control allows the primary flow path 35b of the cascade heat exchanger 35 to function as an evaporator for the primary refrigerant and allows the secondary flow path 35a to function as an evaporator for the secondary refrigerant, to avoid a situation where the primary refrigerant flowing in the primary flow path 35b becomes less likely to gain heat from the secondary refrigerant flowing in the secondary flow path 35a.

When only second heat storing operation is executed as heat storing operation, second heat storing operation starts upon satisfaction of the defrosting condition, and defrosting operation thereafter starts upon satisfaction of the second heat storage completion condition. Alternatively, upon satisfaction of the second heat storage completion condition, similarly to the above case, control of defrosting operation may start in the primary refrigerant circuit 5a after control of defrosting operation initially starts in the secondary refrigerant circuit 10. In an exemplary case where the second heat storage completion condition is satisfied, with the secondary switching mechanism 22 being kept in its connection state in the secondary refrigerant circuit 10, the primary compressor 71 on the primary refrigerant circuit 5a may be stopped until the primary control unit 70 determines that preparation for the start of defrosting operation completes in the primary refrigerant circuit 5a. When the primary control unit 70 thereafter determines that preparation for the start of defrosting operation completes in the primary refrigerant circuit 5a, the secondary compressor 21 on the secondary refrigerant circuit 10 may be activated and the primary compressor 71 on the primary refrigerant circuit 5a may subsequently be activated. Pressure equalizing behavior at the primary refrigerant circuit 5a and switching the primary switching mechanism 72 into the fifth connection state may be executed after satisfaction of the second heat storage completion condition, or upon determination by the primary control unit 70 that preparation for the start of defrosting operation completes in the primary refrigerant circuit 5a. Similarly to the above case, it is possible to avoid the situation where the primary refrigerant flowing in the primary flow path 35b is less likely to gain heat from the secondary refrigerant flowing in the secondary flow path 35a.

(12-2) Other Embodiment B

The above embodiment exemplifies the case where a refrigerant flows in the bypass circuit 46 during second heat storing operation and defrosting operation.

The bypass circuit 46 extends from the gas phase region in the receiver 45. It is thus possible to send a gas-phase refrigerant toward the suction side of the secondary compressor 21 until the receiver 45 is filled with a refrigerant in the liquid state.

In an exemplary case where second heat storing operation or defrosting operation is continuously executed to satisfy a full liquid condition as to the receiver 45 being filled with a liquid refrigerant, the subcooling expansion valve 48a may be opened instead of opening the bypass expansion valve 46a or along with opening the bypass expansion valve 46a, so as to cause the refrigerant to flow also in the subcooling circuit 48.

The full liquid condition as to the receiver 45 being filled with a liquid refrigerant may be exemplarily determined in accordance with the degree of superheating of the refrigerant flowing downstream of the bypass expansion valve 46a in the bypass circuit 46. The degree of superheating may be obtained from temperature detected by the bypass circuit temperature sensor 85, pressure detected by the secondary suction pressure sensor 37, and the like.

(12-3) Other Embodiment C

The above embodiment exemplifies the case where the indoor fans 53a, 53b, and 53c are stopped during first heat storing operation.

However, first heat storing operation is not limited to control to stop the indoor fans 53a, 53b, and 53c during first heat storing operation. For example, the indoor fans 53a, 53b, and 53c may alternatively be controlled to have airflow volume less than airflow volume during normal operation of heating operation or mainly heating operation. This case also inhibits heat release from the secondary refrigerant in the utilization heat exchangers 52a, 52b, and 52c.

(12-4) Other Embodiment D

The above embodiment exemplifies the case where the utilization expansion valves 51a, 51b, and 51c are controlled into the closed state during second heat storing operation and defrosting operation.

However, second heat storing operation and defrosting operation are not limited to control to completely stop the utilization expansion valves 51a, 51b, and 51c. For example, the utilization expansion valves 51a, 51b, and 51c may alternatively be controlled to be smaller in valve opening degree in comparison to normal operation of heating operation or mainly heating operation. This case also inhibits quantity of the secondary refrigerant sent to the utilization heat exchangers 52a, 52b, and 52c, so as to inhibit heat release at the utilization heat exchangers 52a, 52b, and 52c.

Control to open, without closing, the utilization expansion valves 51a, 51b, and 51c may not be executed during heat storing operation or until satisfaction of the predetermined condition from the start of defrosting operation, but may be executed after the start of defrosting operation and upon satisfaction of the following condition. Specifically, examples of the condition include a case where the secondary refrigerant sucked into the secondary compressor 21 in the secondary refrigerant circuit 10 has a degree of superheating equal to or less than a predetermined value, a case where the secondary refrigerant discharged from the secondary compressor 21 has a degree of superheating equal to or less than a predetermined value, a case where the secondary refrigerant in the secondary refrigerant circuit 10 has high pressure equal to or less than a predetermined value, a case where the liquid refrigerant in the secondary refrigerant circuit 10 has temperature equal to or less than a predetermined value, and a case where defrosting operation cannot end even after elapse of predetermined time from the start of defrosting operation.

Whether or not the secondary refrigerant in the secondary refrigerant circuit 10 has high pressure equal to or less than the predetermined value may be exemplarily determined in accordance with pressure detected by the secondary discharge pressure sensor 38. Whether or not the liquid refrigerant in the secondary refrigerant circuit 10 has temperature equal to or less than the predetermined value may be determined in accordance with temperature detected by the receiver outlet temperature sensor 84, temperature detected by the subcooling outlet temperature sensor 86, or the like.

(12-5) Other Embodiment E

The above embodiment exemplifies control to supply the primary flow path 35b of the cascade heat exchanger 35 with the refrigerant discharged from the primary compressor 71 in the primary refrigerant circuit 5a during heat storing operation.

Alternatively, the primary compressor 71 may be stopped during heat storing operation. Furthermore, pressure equalizing control and control to switch the primary switching mechanism 72 may be completed to achieve the connection state enabling the start of defrosting operation, and the primary compressor 71 may be made standby to be activated until completion of heat storing operation.

Alternatively, the primary compressor 71 may be driven as in the above embodiment during first heat storing operation as heat storing operation, and the primary compressor 71 may be stopped during second heat storing operation, pressure equalizing control and control to switch the primary switching mechanism 72 may be completed, and the primary compressor 71 may be made standby to be activated until completion of heat storing operation. This avoids both the primary flow path 35b and the secondary flow path 35a of the cascade heat exchanger 35 from functioning as a refrigerant radiator during second heat storing operation, to inhibit abnormal increase of high pressure of the primary refrigerant or the secondary refrigerant.

(12-6) Other Embodiment F

The above embodiment exemplifies the case where the secondary refrigerant circuit 10 includes the bypass circuit 46 and the subcooling circuit 48.

The secondary refrigerant circuit 10 may alternatively have a flow path allowing a bypass flow to the suction flow path 23 of the refrigerant flowing from the secondary flow path 35a of the cascade heat exchanger 35 to the third connection pipe 7, like the bypass circuit 46 or the subcooling circuit 48 according to the above embodiment.

In this case, as control other than control for the bypass expansion valve 46a or the subcooling expansion valve 48a in the above embodiment, defrosting operation may be exemplarily executed after first heat storing operation. More specifically, defrosting operation may be executed if a predetermined heat storage completion condition is satisfied after the start of first heat storing operation.

The predetermined heat storage completion condition is not limited in this case, and determination can be made in accordance with at least one of conditions such as predetermined time has elapsed from the start of first heat storing operation, the secondary refrigerant discharged from the secondary compressor 21 has pressure equal to or more than a predetermined value, the secondary refrigerant discharged from the secondary compressor 21 has temperature equal to or more than a predetermined value, the secondary refrigerant at a predetermined site having a flow of a liquid refrigerant on the secondary refrigerant circuit 10 has temperature equal to or more than a predetermined value, and the cascade heat exchanger 35 has temperature equal to or more than a predetermined value.

During defrosting operation executed upon satisfaction of the predetermined heat storage completion condition, the control unit 80 executes various control as follows.

At the primary refrigerant circuit 5a, similarly to the above embodiment, the control unit 80 switches the primary switching mechanism 72 into the fifth connection state after executing pressure equalizing behavior, and drives the primary compressor 71 while keeping the primary fan 75 stopped. The control unit 80 controls the valve opening degree of the primary expansion valve 76 such that the degree of superheating of the refrigerant sucked into the primary compressor 71 is kept at the predetermined value. Alternatively, the control unit 80 may control to increase the drive frequency of the primary compressor 71 so as to be higher than the drive frequency during normal operation, or may control the drive frequency of the primary compressor 71 to the predetermined maximum frequency.

In the secondary refrigerant circuit 10, the control unit 80 switches the secondary switching mechanism 22 into the first connection state as well as the fourth connection state after execution of pressure equalizing behavior, controls the utilization expansion valves 51a, 51b, and 51c, the first control valves 66a, 66b, and 66c, and the second control valves 67a, 67b, and 67c into the opened state with the indoor fans 53a, 53b, and 53c being kept stopped, and drives the secondary compressor 21. The heat source expansion valve 36 is controlled into a fully opened state. The valve opening degree of each of the utilization expansion valves 51a, 51b, and 51c may be exemplarily controlled such that the secondary refrigerant sucked into the secondary compressor 21 has a degree of superheating equal to or more than a predetermined value.

(12-7) Other Embodiment G

The above embodiment exemplifies R32 as the refrigerant provided in the primary refrigerant circuit 5a and carbon dioxide as the refrigerant provided in the secondary refrigerant circuit 10.

However, the refrigerant provided in the primary refrigerant circuit 5a should not be limited, and examples thereof include HFC-32, an HFO refrigerant, a refrigerant obtained by mixing HFC-32 and the HFO refrigerant, carbon dioxide, ammonia, and propane.

Furthermore, the refrigerant provided in the secondary refrigerant circuit 10 should not be limited, and examples thereof include HFC-32, an HFO refrigerant, a refrigerant obtained by mixing HFC-32 and the HFO refrigerant, carbon dioxide, ammonia, and propane. Examples of the HFO refrigerant include HFO-1234yf and HFO-1234ze.

The primary refrigerant circuit 5a and the secondary refrigerant circuit 10 may adopt a same refrigerant or different refrigerants.

(12-8) Other Embodiment H

The above embodiment exemplifies, as the secondary refrigerant circuit 10, a refrigerant circuit having three pipes of the first connection pipe 8, the second connection pipe 9, and the third connection pipe 7, and configured to simultaneously execute cooling operation and heating operation.

However, the secondary refrigerant circuit 10 should not be limited to such a refrigerant circuit configured to simultaneously execute cooling operation and heating operation, and may be a circuit including the heat source unit 2 and the utilization units 3a, 3b, and 3c connected via two connection pipes.

(12-9) Others

The cascade heat exchanger may be configured to cause heat exchange between the first refrigerant and the second refrigerant. The second heat exchanger may be configured to cause heat exchange between the second refrigerant and the heating medium.

The refrigeration cycle system may include a control unit configured to cause the system to execute the first operation, the second operation, and the third operation.

Decreasing the supply quantity of the heating medium by the supply unit during the second operation may be decreasing the supply quantity to be less than supply quantity of the heating medium by the supply unit during the first operation.

The first switching unit may switch the flow path of the first refrigerant between the first operation and the third operation.

The first condition should not be limited, but may relate to predetermined frosting at the first heat exchanger and be satisfied before the start of the third operation.

The second compressor may operate continuously from the first operation to the second operation.

During the second operation, the second refrigerant may flow from the second compressor toward the cascade heat exchanger.

(Appendix)

The embodiments of the present disclosure have been described above. Various modifications to modes and details should be available without departing from the object and the scope of the present disclosure recited in the patent claims.

REFERENCE SIGNS LIST

1: refrigeration cycle system
2: heat source unit
3a: first utilization unit
3b: second utilization unit
3c: third utilization unit
4: secondary unit
5: primary unit
5a: primary refrigerant circuit (first circuit)
7: liquid-refrigerant connection pipe
8: high and low-pressure gas-refrigerant connection pipe
9: low-pressure gas-refrigerant connection pipe
10: secondary refrigerant circuit (second circuit)
11: heat source expansion mechanism
12: heat source circuit
13a-c: utilization circuit
20: heat source control unit
21: secondary compressor (second compressor)
21a: compressor motor
22: secondary switching mechanism (second switching unit)
23: suction flow path
24: discharge flow path
25: third heat source pipe
26: fourth heat source pipe
27: fifth heat source pipe
28: first heat source pipe
29: second heat source pipe
30: accumulator
31: third shutoff valve
32: first shutoff valve
33: second shutoff valve
34: oil separator
35: cascade heat exchanger
35a: secondary flow path
35b: primary flow path
36: heat source expansion valve
37: secondary suction pressure sensor
38: secondary discharge pressure sensor
39: secondary discharge temperature sensor
40: oil return circuit
41: oil return flow path
42: oil return capillary tube
44: oil return on-off valve
45: receiver
46: bypass circuit (bypass circuit)
46a: bypass expansion valve
47: subcooling heat exchanger
48: subcooling circuit (bypass circuit)
48a: subcooling expansion valve
50a-c: utilization control unit
51a-c: utilization expansion valve
52a-c: utilization heat exchanger (second heat exchanger)
53a-c: indoor fan (supply unit)
56a, 56b, 56c: second utilization pipe
57a, 57b, 57c: first utilization pipe
58a, 58b, 58c: liquid-side temperature sensor
60a, 60b, 60c: branching unit control unit
61a, 61b, 61c: third branching pipe
62a, 62b, 62c: junction pipe
63a, 63b, 63c: first branching pipe
64a, 64b, 64c: second branching pipe
66a, 66b, 66c: first control valve
67a, 67b, 67c: second control valve
70: primary control unit
71: primary compressor (first compressor)
72: primary switching mechanism (first switching unit)
74: primary heat exchanger (first heat exchanger)
76: primary expansion valve
77: outdoor air temperature sensor
78: primary discharge pressure sensor
79: primary suction pressure sensor
81: primary suction temperature sensor
82: primary heat-exchange temperature sensor
83: secondary cascade temperature sensor
84: receiver outlet temperature sensor
85: bypass circuit temperature sensor
86: subcooling outlet temperature sensor
87: subcooling circuit temperature sensor
88: secondary suction temperature sensor
80: control unit

CITATION LIST

Patent Literature

Patent Literature 1: Japanese Laid-Open Patent Publication No. 2014-109405

The invention claimed is:

1. A refrigeration cycle system comprising:
a first circuit allowing circulation of a first refrigerant and including a first compressor, a cascade heat exchanger, a first heat exchanger, and a first switching mechanism configured to switch a flow path of the first refrigerant;
a second circuit allowing circulation of a second refrigerant and including a second compressor, the cascade heat exchanger, and a second heat exchanger;
a heating medium supply configured to supply a heating medium to exchange heat with the second refrigerant flowing in the second heat exchanger; and
a controller comprising
at least one processor, and
actuators controlled by the at least one processor to regulate operation of the heating medium supply, the first and second compressors, and the first switching mechanism,
wherein the at least one processor is programmed to control the actuators to perform a process comprising
executing a first operation of operating the heating medium supply in an active mode while circulating the first refrigerant in the order of the first compressor, the cascade heat exchanger, and the first heat exchanger and circulating the second refrigerant in the order of the second compressor, the second heat exchanger, and the cascade heat exchanger,
while the first operation is being executed, and in response to a first condition being satisfied during the execution of the first operation, executing a second operation to operate the second compressor while stopping or decreasing the heating medium supply in supply quantity of the heating medium, and
in response to a second condition being satisfied during the execution of the second operation, execute a third operation of circulating the first refrigerant in the order of the first compressor, the first heat exchanger, and the cascade heat exchanger.

2. The refrigeration cycle system according to claim 1, wherein
the second operation includes circulating the second refrigerant in the order of the second compressor, the second heat exchanger, and the cascade heat exchanger.

3. The refrigeration cycle system according to claim 1, wherein
the second circuit includes a second switching mechanism configured to switch a flow path of the second refrigerant, and
the second operation includes circulating the second refrigerant in the order of the second compressor, the cascade heat exchanger, and the second heat exchanger.

4. The refrigeration cycle system according to claim 1, wherein
the second circuit includes a bypass circuit connecting a portion between the second heat exchanger and the cascade heat exchanger, and a suction flow path of the second compressor, and a second switching mechanism configured to switch a flow path of the second refrigerant, and
during the second operation, at least part of the second refrigerant having passed the cascade heat exchanger flows toward the suction flow path of the second compressor via the bypass circuit.

5. The refrigeration cycle system according to claim 1, wherein
the second operation includes circulating the first refrigerant in the order of the first compressor, the cascade heat exchanger, and the first heat exchanger.

6. The refrigeration cycle system according to claim 1, wherein
the second condition is one of:
a high-pressure refrigerant pressure of the second refrigerant in the second circuit or a discharge temperature of the second refrigerant discharged from the second compressor satisfying a predetermined condition during the second operation, and
the second operation is being executed for a predetermined time.

7. The refrigeration cycle system according to claim 1, wherein
the second circuit includes a bypass circuit connecting a portion between the second heat exchanger and the cascade heat exchanger, and a suction flow path of the second compressor, and
during the third operation, at least part of the second refrigerant having passed the cascade heat exchanger flows toward the suction flow path of the second compressor via the bypass circuit.

8. The refrigeration cycle system according to claim 7, wherein
the third operation starts with circulating the first refrigerant in the order of the first compressor, the first heat exchanger, and the cascade heat exchanger simultaneously when or after at least part of the second refrigerant having passed the cascade heat exchanger starts flowing toward the suction flow path of the second compressor via the bypass circuit.

9. The refrigeration cycle system according to claim 2, wherein
the second operation includes circulating the first refrigerant in the order of the first compressor, the cascade heat exchanger, and the first heat exchanger.

10. The refrigeration cycle system according to claim 3, wherein
the second operation includes circulating the first refrigerant in the order of the first compressor, the cascade heat exchanger, and the first heat exchanger.

11. The refrigeration cycle system according to claim 4, wherein
the second operation includes circulating the first refrigerant in the order of the first compressor, the cascade heat exchanger, and the first heat exchanger.

12. The refrigeration cycle system according to claim 2, wherein
the second condition is one of:
a high-pressure refrigerant pressure of the second refrigerant in the second circuit or a discharge temperature of the second refrigerant discharged from the second compressor satisfying a predetermined condition during the second operation, and
the second operation is being executed for a predetermined time.

13. The refrigeration cycle system according to claim 3, wherein
the second condition is one of:
a high-pressure refrigerant pressure of the second refrigerant in the second circuit or a discharge temperature of the second refrigerant discharged from the second compressor satisfying a predetermined condition during the second operation, and
the second operation is being executed for a predetermined time.

14. The refrigeration cycle system according to claim 4, wherein
the second condition is one of:
a high-pressure refrigerant pressure of the second refrigerant in the second circuit or a discharge temperature of the second refrigerant discharged from the second compressor satisfying a predetermined condition during the second operation, and
the second operation is being executed for a predetermined time.

15. The refrigeration cycle system according to claim 5, wherein
the second condition is one of:
a high-pressure refrigerant pressure of the second refrigerant in the second circuit or a discharge temperature of the second refrigerant discharged from the second compressor satisfying a predetermined condition during the second operation, and
the second operation being executed for a predetermined time.

* * * * *